United States Patent
Ji et al.

(10) Patent No.: US 12,451,254 B2
(45) Date of Patent: Oct. 21, 2025

(54) METHOD AND DIAGNOSTIC APPARATUS FOR DETERMINING CONSTIPATION USING MACHINE LEARNING MODEL

(71) Applicant: HEM PHARMA INC., Pohang-si (KR)

(72) Inventors: Yo Sep Ji, Suwon-si (KR); So Young Park, Suwon-si (KR)

(73) Assignee: HEM PHARMA INC., Pohang-si (KR)

( * ) Notice: Subject to any disclaimer, the term of this patent is extended or adjusted under 35 U.S.C. 154(b) by 117 days.

(21) Appl. No.: 18/463,413

(22) Filed: Sep. 8, 2023

(65) Prior Publication Data

US 2023/0420136 A1 Dec. 28, 2023

Related U.S. Application Data

(63) Continuation of application No. PCT/KR2022/003982, filed on Mar. 22, 2022.

(30) Foreign Application Priority Data

Mar. 26, 2021 (KR) ........................ 10-2021-0039437

(51) Int. Cl.
*G16H 50/20* (2018.01)
*G16B 5/00* (2019.01)

(52) U.S. Cl.
CPC ............... *G16H 50/20* (2018.01); *G16B 5/00* (2019.02)

(58) Field of Classification Search
CPC .................................. G16H 50/20; G16B 5/00
See application file for complete search history.

(56) References Cited

U.S. PATENT DOCUMENTS 11,447,811 B2 * 9/2022 Smith .................. A23L 33/135
2012/0149854 A1 6/2012 Murray et al.

FOREIGN PATENT DOCUMENTS

| KR | 102057047 B1 | 12/2019 |
| KR | 102103281 B1 | 4/2020 |
| KR | 1020200054203 A | 5/2020 |
| KR | 102103280 B1 | 6/2020 |
| KR | 102151497 B1 | 9/2020 |
| KR | 102373886 B1 | 3/2022 |

(Continued)

OTHER PUBLICATIONS

Lapidot, American Society For Microbiology, 2020, pp. 1-12.*

(Continued)

*Primary Examiner* — Michael I Ezewoko
(74) *Attorney, Agent, or Firm* — NKL Law; Jae Youn Kim

(57) ABSTRACT

A method for determining whether constipation is present by using a machine learning model. The method includes a process of analyzing a mixture of a gut-derived substance collected from a subject and a gut environment-like composition, a process of extracting multiple microbial data based on an analysis result of the mixture, a process of selecting microbe-related features to be used in the machine learning model from the multiple microbial data based on a predetermined feature selection algorithm, a process of training the machine learning model with the microbe-related features, and a process of inputting, to the trained machine learning model, the microbial data collected from the subject to be tested and determining whether constipation is present.

16 Claims, 31 Drawing Sheets

(56) References Cited

FOREIGN PATENT DOCUMENTS

KR          102373888 B1    3/2022
WO          2014121298 A2   8/2014

OTHER PUBLICATIONS

Jacobson, 2018, Elsevier, pp. 296-307.*
Biswas, Elsevier, 2012, pp. 14-24.*
Masahiro Sato, et al., Mutually Beneficial Symbiosis Between Human and Gut-Dominant Bacteroides Species Through Bacterial Assimilation of Host Mucosubstances. Laboratory of Basic and Applied Molecular Biotechnology, Division of Food Science and Biotechnology, Graduate School of Agriculture, Kyoto University, Uji, Kyoto 611-0011, Japan.
Wylensek, D., Hitch, T.C.A., Riedel, T. et al. A collection of bacterial isolates from the pig intestine reveals functional and taxonomic diversity. Nat Commun 11, 6389 (2020).

* cited by examiner

FIG. 2

PMAS process

HOMOGENIZATION BY MIXING FECES SAMPLE WITH PMAS MEDIUM

DISPENSE SAME AMOUNT OF SAMPLE (REPLICATE GUT MICROBIOME IN FECES)

TREAT DISPENSED SAMPLE WITH CANDIDATE MATERIAL

CULTURE FOR PREDETERMINED PERIOD OF TIME UNDER ANAEROBIC CONDITIONS

ANALYZE RESULT OF EACH WELL AFTER CULTURING
- gut microbiota (NGS)
- short-chain fatty acids (GC)

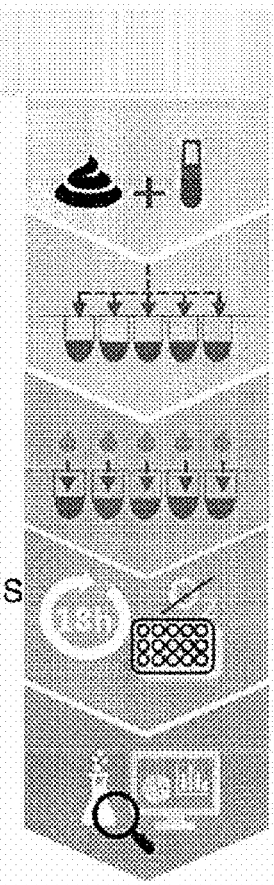

COMPARE IN TERMS OF GUT ENVIRONMENT IMPROVEMENT AFTER PMAS CULTURING TREATED WITH SEVERAL CANDIDATE MATERIALS
→ SCREEN GUT ENVIRONMENT-IMPROVING CANDIDATE MATERIAL BASED ON GUT MICROBIOME IN FECES

Example

*FIG. 6C*

MCMOD

```
> clinic.pnas.cnspt.xgb.imp.mtx
                                                                    Feature     Gain     Cover  Frequency
1:                         Lachnospiraceae_.Eubacterium._hallii_group_NA  0.149637936  0.138351152  0.132478632
2:  Lachnospiraceae_.Ruminococcus._gauvreauii_group_uncultured_organism  0.123748314  0.128939225  0.128205128
3:                                  Erysipelatoclostridiaceae_NA_NA  0.108125090  0.008599561  0.035256410
4:                                       RF39_RF39_gut_metagenome  0.107034387  0.105066155  0.077991453
5:                      Pseudomonadaceae_Pseudomonas_uncultured_bacterium  0.091454932  0.098879360  0.110042735
6:                                   Prevotellaceae_Prevotella_NA  0.067971810  0.065602495  0.073717949
7:             Lachnospiraceae_.Ruminococcus._gauvreauii_group_NA  0.061607510  0.093561840  0.113247863
8:                             Desulfovibrionaceae_Bilophila_NA  0.054017256  0.058081404  0.064102564
9:                   Prevotellaceae_uncultured_uncultured_bacterium  0.053202354  0.040771281  0.047008547
10:                     Clostridiaceae_Clostridium_sensu_stricto_1_NA  0.039674874  0.048147750  0.057692308
11:                   Prevotellaceae_Prevotella_Prevotella_stercorea  0.038893613  0.014796951  0.010683761
12:                                        Gemellaceae_Gemella_NA  0.025847378  0.009265565  0.008547009
13:                   Bacteroidaceae_Bacteroides_bacterium_NLAE.zl.H13  0.022352422  0.033269983  0.036324786
14:                             Streptococcaceae_Streptococcus_NA  0.020288909  0.046069094  0.050213675
15:                  Anaerofustaceae_Anaerofustis_uncultured_bacterium  0.018914548  0.032998218  0.039529915
16:                          Monoglobaceae_Monoglobus_NA  0.012979667  0.013796717  0.012820513
17:               Bacteroidaceae_Bacteroides_Bacteroidaceae_bacterium  0.004249801  0.002682648  0.002136752
```

FIG. 6D

SMOD

```
> clinic.orf.cnspt.xgb.tmp.mtx
                                                          Feature       Gain       Cover   Frequency
 1:              Selenomonadaceae_Mitsuokella_uncultured_bacterium  0.212578987  0.216305847  0.223273415
 2:             Erysipelotrichaceae_Holdemanella_uncultured_bacterium  0.160426828  0.108935127  0.099337748
 3:                    Ruminococcaceae_CAG.352_uncultured_bacterium  0.151890572  0.131049230  0.118259224
 4: Clostridia_vadinBB60_group_Clostridia_vadinBB60_group_uncultured_prokaryote  0.149319455  0.187477279  0.184484390
 5:             Pseudomonadaceae_Pseudomonas_uncultured_bacterium  0.093554829  0.147048060  0.147587512
 6:                                          Oscillospiraceae_NA_NA  0.065878097  0.087650999  0.105960265
 7:        Lachnospiraceae_.Ruminococcus._gauvreauii_group_uncultured_organism  0.047703742  0.036599338  0.044465468
 8:                Micrococcaceae_Rothia_Rothia_mucilaginosa  0.036449478  0.013450455  0.008514064
 9:              Lachnospiraceae_.Eubacterium._eligens_group_NA  0.034591258  0.027005497  0.010083254
10:                 Ruminococcaceae_Ruminococcus_metagenome  0.034096404  0.035059505  0.043519395
11:          Tannerellaceae_Parabacteroides_Parabacteroides_gordonii  0.012392657  0.005565153  0.006622517
12:            Lactobacillaceae_Lactobacillus_Lactobacillus_fuchuensis  0.001117793  0.002593510  0.001892148
```

PCoA plot (Unweighted UniFrac Distance)

FIG. 8B

```
Permutation test for adonis under reduced model
Terms added sequentially (first to last)
Permutation: free
Number of permutations: 999 adonis2(formula = physeq.asv_UWunif ~ MODvar, data = sampledf)
         Df SumOfSqs      R2      F Pr(>F)
MODvar    1  0.20922  0.2296 4.1724  0.001 ***
Residual 14  0.70202  0.7704
Total    15  0.91124  1.0000
---
signif. codes:  0 '***' 0.001 '**' 0.01 '*' 0.05 '.' 0.1 ' ' 1
```

```
         Homogeneity of multivariate dispersions

Call: betadisper(d = physeq.asv_UWunif, group = sampledf$MODvar)

No. of Positive Eigenvalues: 15
No. of Negative Eigenvalues: 0

Average distance to median:
  MCMOD   SMOD
 0.1792  0.2340

Eigenvalues for PCoA axes:
(showing 8 of 15 eigenvalues)
  PCoA1   PCoA2   PCoA3   PCoA4   PCoA5   PCoA6   PCoA7   PCoA8
0.24326 0.12593 0.08415 0.07367 0.06846 0.05442 0.04798 0.04487
```

ROC Curve w/ Thresholds

Example
AUC: 0.9231

FIG. 10A

```
Confusion Matrix and Statistics

Reference
Prediction 0 1
         0 9 0
         1 4 9

Accuracy : 0.8182
                95% CI : (0.5972, 0.9481)
   No Information Rate : 0.5909
   P-Value [Acc > NIR] : 0.02181

Kappa : 0.648

Mcnemar's Test P-Value : 0.13361

Sensitivity : 1.0000
           Specificity : 0.6923
        Pos Pred Value : 0.6923
        Neg Pred Value : 1.0000
            Prevalence : 0.4091
        Detection Rate : 0.4091
  Detection Prevalence : 0.5909
     Balanced Accuracy : 0.8462

'Positive' Class : 1
```

Example

FIG. 10B

```
Confusion Matrix and Statistics

Reference
Prediction 0 1
         0 6 4
         1 3 9

Accuracy : 0.6818
                95% CI : (0.4513, 0.8614)
   No Information Rate : 0.5909
   P-Value [Acc > NIR] : 0.2608

Kappa : 0.3529

Mcnemar's Test P-Value : 1.0000

Sensitivity : 0.6923
           Specificity : 0.6667
        Pos Pred Value : 0.7500
        Neg Pred Value : 0.6000
            Prevalence : 0.5909
        Detection Rate : 0.4091
  Detection Prevalence : 0.5455
     Balanced Accuracy : 0.6795

'Positive' Class : 1
```

Comparative Example

Example

Example

Comparative Example

METHOD AND DIAGNOSTIC APPARATUS FOR DETERMINING CONSTIPATION USING MACHINE LEARNING MODEL

TECHNICAL FIELD

The present disclosure relates to a method and diagnostic apparatus for determining constipation using machine learning model.

BACKGROUND

Constipation is defined as uncomfortable bowel movements such as irregular stooling patterns or dry stools. Constipation can be broadly classified into atonic constipation and spastic constipation.

Atonic constipation is commonly referred to as constipation and refers to a symptom where food residues remain in the large intestine for a long time as a result of insufficient bowel movements for stool, and, thus, the contents of the large intestine solidify during the process of absorbing moisture into the body. Atonic constipation is mainly caused by lifestyle, such as lack of exercise, old age, and pregnancy, or physical characteristics.

Spastic constipation is also called irritable bowel syndrome, and refers to a symptom where the intestinal nerves are stimulated and the large intestine is in a hypersensitive state, which causes irregular contractions or makes it difficult for stool to pass. Spastic constipation is mainly caused by ingested food or mental fatigue, such as stress and overwork.

According to the statistics of the National Health Insurance Review and Assessment Service, the number of patients with constipation in Korea increased by about 13.1% from 578,000 in 2011 to 655,000 in 2016, and it continues to increase to this day.

Meanwhile, the term "genome" refers to genes present in chromosomes, the term "microbiota" refers to the collection of microbes populating an environment, and the term "microbiome" refers to the collection of all the genomes of these microbes in the environment. Here, the microbiome may refer to the combination of genome and microbiota.

Recently, there has been an attempt to diagnose constipation by identifying a microbe that can act as a causative agent of constipation through metagenome analysis of microbiota.

In this regard, Korean Patent No. 10-2057047, one of the prior art references, relates to a disease prediction apparatus and a disease prediction method using the same, and discloses a method for predicting a disease of a predetermined person by comparing a learning vector with a predetermined person vector extracted from a biosignal of the predetermined person.

However, according to the prior art reference, bacterial metagenome analysis is performed without any special process, such as sample culturing, and it is difficult to accurately derive a causative agent of constipation due to a large bias among samples of each subject.

Further, when a machine learning model is trained using unprocessed samples of each subject as training data, the training data contain a large amount of noise, which causes a significant degradation in performance of the machine learning model.

SUMMARY

The present disclosure is conceived to solve the above-described problems and improve the performance of a machine learning model for diagnosing the presence or absence of constipation by selecting microbe-related features from multiple microbial data based on an analysis result of a mixture of a sample and a gut environment-like composition.

The problems to be solved by the present disclosure are not limited to the above-described problems. There may be other problems to be solved by the present disclosure.

To solve the problems, one example of of the present disclosure provides a method for diagnosing the presence or absence of constipation is present by using a machine learning model, comprising: a process of analyzing a mixture of a gut-derived substance collected from a subject and a gut environment-like composition, a process of extracting multiple microbial data based on an analysis result of the mixture, a process of selecting microbe-related features to be used in the machine learning model from the multiple microbial data based on a predetermined feature selection algorithm, a process of training the machine learning model with the microbe-related features and a process of inputting, to the trained machine learning model, the microbial data collected from the subject to be tested and determining whether constipation is present, wherein the microbe-related features include the amount of one or more microbes selected from genera included in families, Lachnospiraceae, Erysipelatoclostridiaceae, Pseudomondaeae, Prevotellaceae, Desulfovibrionaceae, Clostridiaceae, Gemellaceae, Bacteroidaceae, Streptococcaceae, Anaerofustaceae, Monoglobaceae, and RF39.

Also, another example of the present disclosure provides an apparatus of diagnosing the presence or absence of constipation by using a machine learning model, comprising: a microbial data extraction unit that extracts multiple microbial data based on an analysis result of a mixture of a gut-derived substance collected from a subject and a gut environment-like composition, a feature selection unit that selects microbe-related features to be used in the machine learning model from the multiple microbial data based on a predetermined feature selection algorithm, a training unit that trains the machine learning model with the microbe-related features and a diagnosis unit that inputs, to the trained machine learning model, the microbial data collected from the subject to be tested and diagnoses constipation, wherein the microbe-related features include the amount of one or more microbes selected from genera included in families, Lachnospiraceae, Erysipelatoclostridiaceae, Pseudomondaeae, Prevotellaceae, Desulfovibrionaceae, Clostridiaceae, Gemellaceae, Bacteroidaceae, Streptococcaceae, Anaerofustaceae, Monoglobaceae, and RF39.

The above-described problem-solving means are merely illustrative and should not be interpreted as limiting the present invention. In addition to the above-described exemplary embodiments, additional embodiments described in the drawings and the detailed description of the invention may exist.

According to any one of the above-described means for solving the problems of the present disclosure, it is possible to improve the performance of a machine learning model for diagnosing the presence or absence of constipation by selecting microbe-related features from multiple microbial data based on an analysis result of a mixture of a gut-derived substance and a gut environment-like composition.

BRIEF DESCRIPTION OF THE DRAWINGS

FIG. 2 is a diagram illustrating an MCMOD technique according to an example of the present disclosure.

FIG. 6C is a diagram for explaining the importance of selected microbe-related features.

FIG. 6D is a diagram for explaining the importance of selected microbe-related features.

FIG. 8B is a diagram comparing analysis results of respective samples according to the method for diagnosing the presence or absence of constipation of the example of the present disclosure and the method of the comparative example.

FIG. 10A is a diagram comparing the XGB models in terms of performance according to the method for diagnosing the presence or absence of constipation of the example of the present disclosure.

FIG. 10B is a diagram comparing the XGB models in terms of performance according to the method for diagnosing the presence or absence of constipation of the comparative example.

DETAILED DESCRIPTION OF EXEMPLARY EMBODIMENTS

Figure 1:
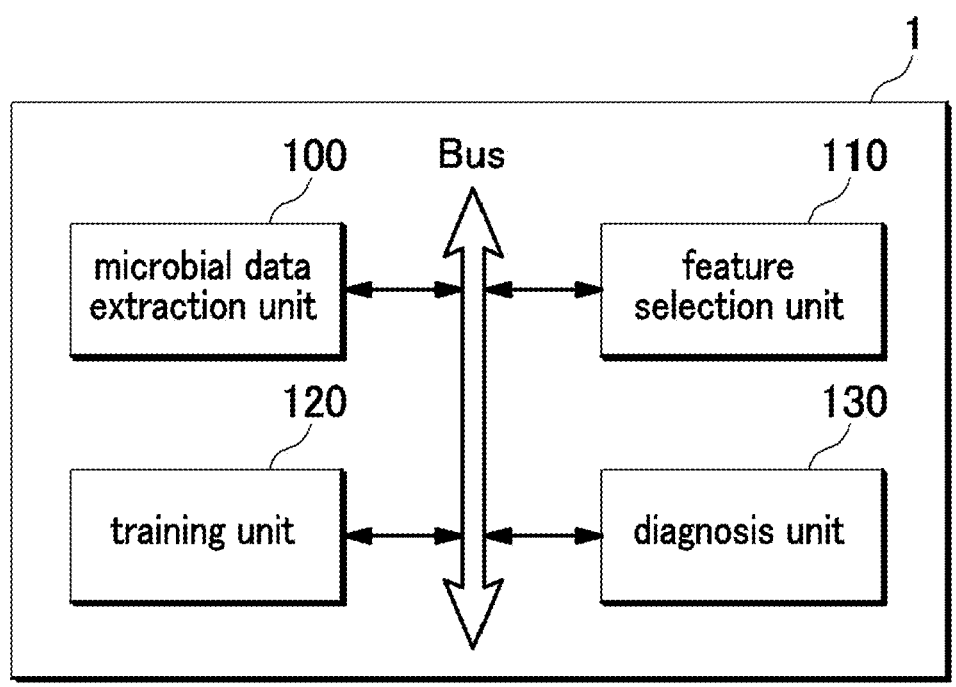
FIG. 1 is a block diagram illustrating a diagnostic apparatus according to an example of the present disclosure.
Figure 3:
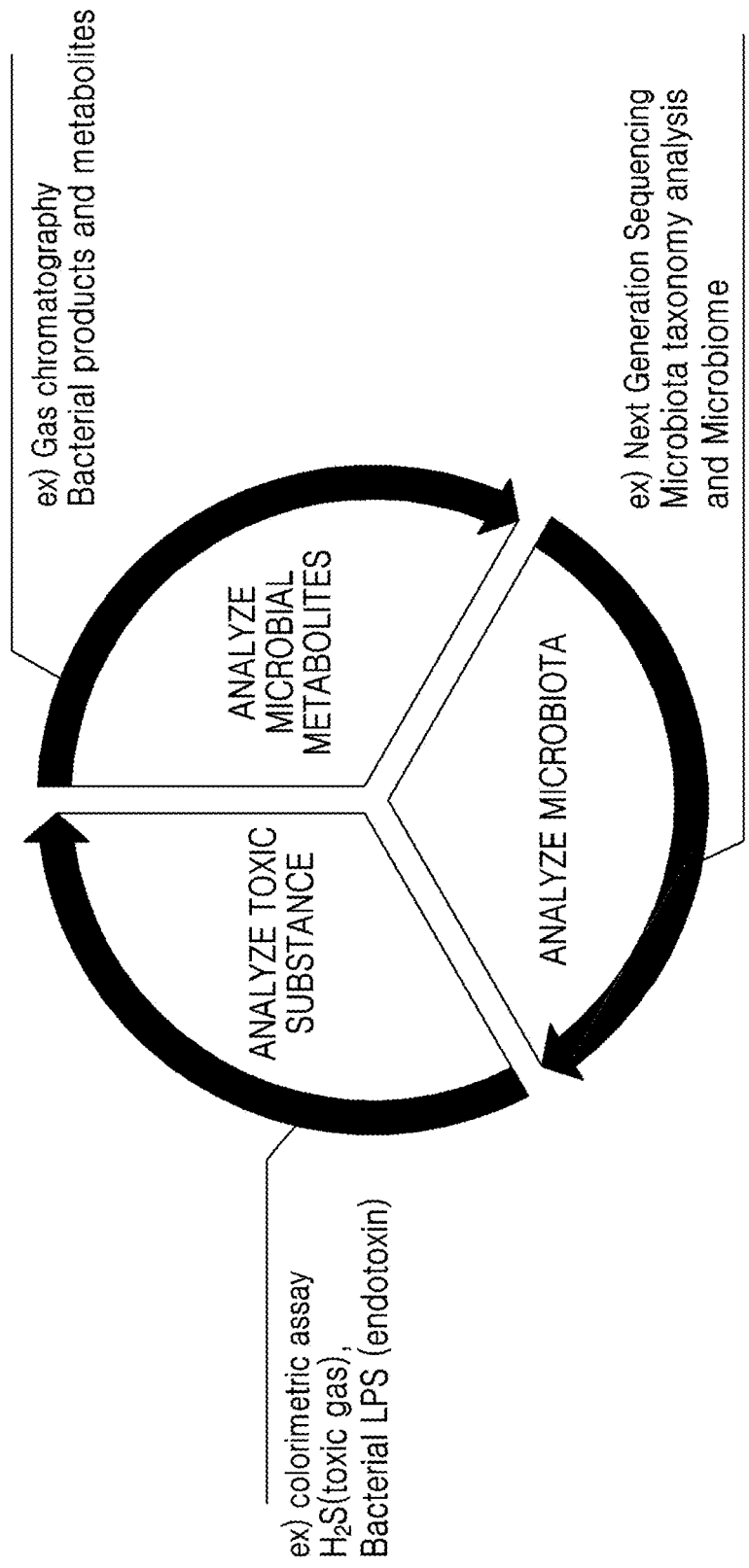
FIG. 3 is a diagram for explaining a sample analysis through the MCMOD technique according to an example of the present disclosure.
Figure 4:
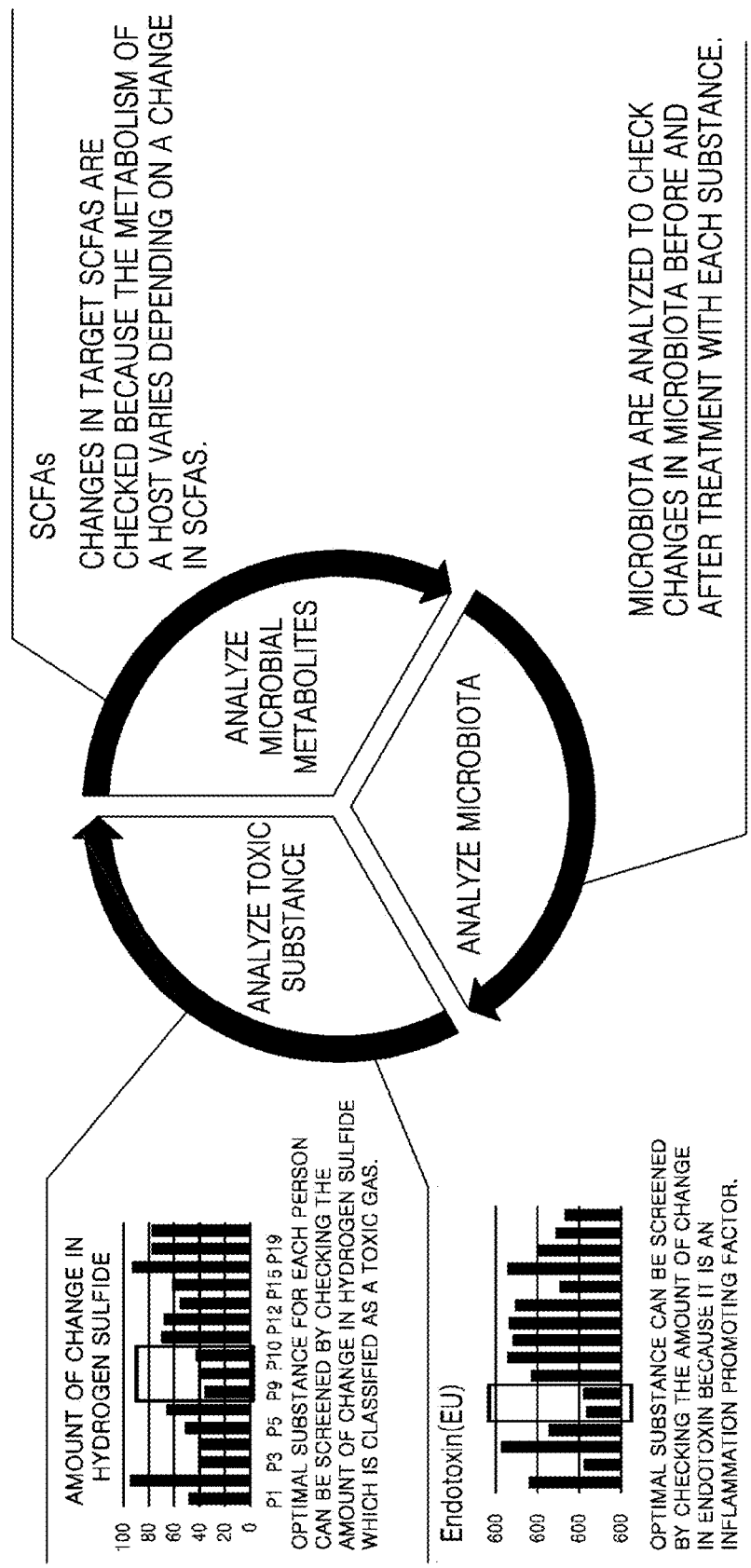
FIG. 4 is a diagram for explaining the interpretation of a sample analysis result through the MCMOD technique according to an example of the present disclosure.

A Hereafter, embodiments of the present disclosure will be described in detail with reference to the accompanying drawings so that the present disclosure may be readily implemented by a person with ordinary skill in the art. However, it is to be noted that the present disclosure is not limited to the embodiments but may be embodied in various other ways. In drawings, parts irrelevant to the description are omitted for the simplicity of explanation, and like reference numerals denote like parts through the whole document.

Throughout this document, the term "connected to" may be used to designate a connection or coupling of one element to another element and includes both an element being "directly connected" another element and an element being "electronically connected" to another element via another element. Further, it is to be understood that the terms "comprises," "includes," "comprising," and/or "including" means that one or more other components, steps, operations, and/or elements are not excluded from the described and recited systems, devices, apparatuses, and methods unless context dictates otherwise; and is not intended to preclude the possibility that one or more other components, steps, operations, parts, or combinations thereof may exist or may be added.

Throughout the whole document, the term "unit" includes a unit implemented by hardware or software and a unit implemented by both of them. One unit may be implemented by two or more pieces of hardware, and two or more units may be implemented by one piece of hardware.

In the present specification, some of operations or functions described as being performed by a device may be performed by a server connected to the device. Likewise, some of operations or functions described as being performed by a server may be performed by a device connected to the server.

Hereinafter, embodiments of the present disclosure will be described in detail with reference to the accompanying drawings.

FIG. 1 is a block diagram illustrating a diagnostic apparatus according to an example of the present disclosure. Referring to FIG. 1, a diagnostic apparatus 1 may include a microbial data extraction unit 100, a feature selection unit 110, a training unit 120, and a diagnosis unit 130.

Examples of the diagnostic apparatus 1 may include a personal computer such as a desktop computer or a laptop computer, as well as a mobile device capable of wired/wireless communication. The mobile device is a wireless communication device that ensures portability and mobility and may include a smartphone, a tablet PC, a wearable device and various kinds of devices equipped with a communication module such as Bluetooth (BLE, Bluetooth Low Energy), NFC, RFID, ultrasonic waves, infrared rays, Wi-Fi, Li-Fi, and the like. However, the diagnostic apparatus 1 is not limited to the shape illustrated in FIG. 1 or the above examples.

The diagnostic apparatus 1 may detect a biomarker for diagnosing constipation caused by abnormalities in the gut environment in a sample collected from a subject.

For example, the diagnostic apparatus 1 may diagnose constipation based on a sample preparation process, a sample pretreatment process, a sample analysis process, a data analysis process, and derived data.

In an embodiment, the biomarker may be a substance detected in the gut, and specifically, it may include microbiota, endotoxins, hydrogen sulfide, gut microbial metabolites, short-chain fatty acids and the like, but is not limited thereto.

The microbial data extraction unit 100 may extract multiple microbial data based on an analysis result of a mixture of a sample collected from a subject and a gut environment-like composition. Herein, the multiple microbial data may be classified into a training set to be used for training and a test set, and a classification ratio may vary, such as 9:1, 7:3, 5:5 and the like, and may be preferably 7:3.

According to the present disclosure, pretreatment for analyzing a mixture of a sample and a gut environment-like composition is performed. In the present disclosure, the pretreatment may be referred to as MCMOD (Meta-culture Multi-Omics Diagnose).

For example, an in-vitro analysis of fecal microbiome and metabolites is performed to feces samples obtained from humans and various animals that can most easily represent the gut microbial environment in vivo.

Herein, the term "subject" refers to any living organism which may have a gut disorder, may have a disease caused by a gut disorder or develop it or may be in need of an improvement of gut environment. Specific examples thereof may include, but not limited to, mammals such as mice, monkeys, cattle, pigs, minipigs, domestic animals and humans, birds, cultured fish, and the like.

The term "sample" refers to a material derived from the subject and specifically may be cells, urine, feces, or the like, but may not be limited thereto as long as a material, such as microbiota, gut microbial metabolites, endotoxins and short-chain fatty acids, present in the gut can be detected therefrom.

The term "gut environment-like composition" may refer to a composition prepared for mimicking identically/similarly mimicking the gut environment of the subject in vitro. For example, the gut environment-like composition may be a culture medium composition, but is not limited thereto.

The gut environment-like composition may include L-cysteine hydrochloride and mucin.

Herein, the term "L-cysteine hydrochloride" is one of amino acid supplements and plays an important role in metabolism as a component of glutathione in vivo and is also used to inhibit browning of fruit juices and oxidation of vitamin C.

L-cysteine hydrochloride may be contained at a concentration of, for example, from 0.001% (w/v) to 5% (w/v), specifically from 0.01% (w/v) to 0.1% (w/v).

L-cysteine hydrochloride is one of various formulations or forms of L-cysteine, and the composition may include L-cysteine including other types of salts as well as L-cysteine.

The term "mucin" is a mucosubstance secreted by the mucous membrane and includes submandibular gland mucin and others such as gastric mucosal mucin and small intestine mucin. Mucin is one of glycoproteins and known as one of energy sources such as carbon sources and nitrogen sources that gut microbiota can actually use.

Mucin may be contained at a concentration of, for example, 0.01% (w/v) to 5% (w/v), specifically, from 0.1% (w/v) to 1% (w/v), but is not limited thereto.

In an embodiment, the gut environment-like composition may not include any nutrient other than mucin and specifically may not include a nitrogen source and/or carbon source such as protein and carbohydrate.

The protein that serves as a carbon source and nitrogen source may include one or more of tryptone, peptone and yeast extract, but may not be limited thereto. Specifically, the protein may be tryptone.

The carbohydrate that serves as a carbon source may include one or more of monosaccharides such as glucose, fructose and galactose and disaccharides such as maltose and lactose, but may not be limited thereto. Specifically, the carbohydrate may be glucose.

In an embodiment, the gut environment-like composition may not include glucose and tryptone, but is not limited thereto.

The gut environment-like composition may further include one or more selected from the group consisting of sodium chloride (NaCl), sodium carbonate (NaHCO$_3$), potassium chloride (KCl) and hemin. Specifically, sodium chloride may be contained at a concentration of, for example, from 10 mM to 100 mM, sodium carbonate may be contained at a concentration of, for example, from 10 mM to 100 mM, potassium chloride may be contained at a concentration of, for example, from 1 mM to 30 mM, and hemin may be contained at a concentration of, for example, from $1\times10^{-6}$ g/L to $1\times10^{-4}$ g/L, but is not limited thereto.

In the pretreatment, the mixture may be cultured for 18 to 24 hours under anaerobic conditions.

For example, in an anaerobic chamber, the same amount of a homogenized feces-medium mixture is dispensed to each of culture plates such as 96-well plates. Herein, the culture may be performed for 12 hours to 48 hours, specifically, for 18 hours to 24 hours, but is not limited thereto.

Then, the plates are cultured under anaerobic conditions with temperature, humidity and motion similar to those of the gut environment to ferment and culture the respective test groups.

After the culturing of the mixture, a culture in which the mixture has been cultured is analyzed. The analysis of the culture may be to extract microbial data including at least one of the content, concentration and kind of one or more of endotoxins, hydrogen sulfides, short-chain fatty acids (SCFAs) and microbiota-derived metabolites contained in the culture, and a change in kind, concentration, content or diversity of bacteria included in the microbiota, but is not limited thereto.

Herein, the term "endotoxin" is a toxic substance that can be found inside a bacterial cell and acts as an antigen composed of a complex of proteins, polysaccharides, and lipids. In an embodiment, the endotoxin may include lipopolysaccharides (LPS), but may not limited thereto, and the LPS may be specifically gram negative and pro-inflammatory.

The term "short-chain fatty acid (SCFA)" refers to a short-length fatty acid with six or fewer carbon atoms and is a representative metabolite produced from gut microbiota. The SCFA has useful functions in the body, such as an increase in immunity, stabilization of gut lymphocytes, a decrease in insulin signaling, and stimulation of sympathetic nerves.

In an embodiment, the short-chain fatty acids may include one or more selected from the group consisting of formate, acetate, propionate, butyrate, isobutyrate, valerate and isovalerate, but may not be limited thereto.

The culture may be analyzed by various analysis methods, such as genetic analysis methods including absorbance analysis, chromatography analysis and next generation sequencing, and metagenomic analysis methods, that can be used by a person with ordinary skill in the art.

When the culture is analyzed, the culture may be centrifuged to separate a supernatant and a precipitate and then, the supernatant and the precipitate (pallet) may be analyzed. For example, metabolites, short-chain fatty acids, toxic substances, etc. from the supernatant and microbiota from the pallet may be analyzed.

For example, after the culturing is completed, toxic substances, such as hydrogen sulfide and bacterial LPS (endotoxin), microbial metabolites, such as short-chain fatty acids, from the supernatant obtained by centrifugation of the cultured test groups are analyzed through absorbance analysis and chromatography analysis, and a culture-independent analysis method is performed to the microbiota from the centrifuged pellet. For example, the amount of change in hydrogen sulfide produced by the culturing may be measured through a methylene blue method using N,N-dimethyl-p-phenylene-diamine and iron chloride ($FeCl_3$) and the level of endotoxins that is one of inflammation promoting factors may be measured using an endotoxin assay kit.

Also, microbial metabolites such as short-chain fatty acids including acetate, propionate and butyrate can be analyzed through gas chromatography.

Microbiota can be analyzed by genome-based analysis through metagenomic analysis such as real-time PCR in which all genomes are extracted from a sample and a bacteria-specific primer suggested in the GULDA method or next generation sequencing.

According to the present disclosure, the culture is analyzed in a state where the gut environment is implemented in vitro by using the gut environment-like composition, and, thus, it is possible to reduce a bias between training data by optimizing the training data before machine learning.

Accordingly, it is possible to facilitate selection of microbe-related features to be described later and also improve the performance of a machine learning model by training the machine learning model based on the microbe-related features. Therefore, it is possible to increase the accuracy in diagnosing constipation through the trained machine learning model.

The feature selection unit 110 may perform selection (i.e., feature selection) of microbe-related features from multiple microbial data as features to be used for the machine learning model based on a predetermined feature selection algorithm. The number of the microbe-related features may be 12 to 20. For example, the number of the microbe-related features may be 17.

Features (variables or attributes) are used in creating a machine learning model. If a large number of features or inappropriate features are used, the machine learning model may overfit data or the prediction accuracy may decrease.

Accordingly, in order for the machine learning model to have a high prediction accuracy, it is necessary to use an appropriate combination of features. That is, it is possible to reduce the complexity of the machine learning model while using as few features as possible by selecting features most closely related to a response feature to be predicted.

The feature selection algorithm may include at least one of, for example, a Boruta algorithm and a recursive feature elimination (RFE) algorithm.

The microbe-related features selected from a predetermined feature selection algorithm may include the amount of one or more microbes selected from genera included in families, Lachnospiraceae, Erysipelatoclostridiaceae, Pseudomondaeae, Prevotellaceae, Desulfovibrionaceae, Clostridiaceae, Gemellaceae, Bacteroidaceae, Streptococcaceae, Anaerofustaceae, Monoglobaceae, and RF39.

In an embodiment, the microbe-related features selected from the predetermined feature selection algorithm may further include the amount of one or more microbes selected from species included in genera, for example, *Eubacterium, Ruminococcus, Pseudomonas, Prevotella, Bilophila, Clostridium, Gemella, Bacteroides, Streptococcus, Anaerofustis, Monoglobus*, and RF39.

The training unit 120 may train the machine learning model with the microbe-related features.

For example, the training unit 120 may train machine learning model to predict whether constipation is present for each of microbial data by performing supervised learning based on labeling of whether constipation is present for each of the microbial data (learning data) and the amount of microbes related to the selected feature.

The machine learning model may include at least one of, for example, a linear regression analysis (LRA) model, a random forest model, a generalized linear (GLM) model, a gradient boosting model, and an extreme gradient boosting (XGB) model.

The diagnosis unit 130 may diagnose constipation by inputting, to the trained machine learning model, the microbial data collected from the subject to be tested.

For example, the diagnosis unit 130 may diagnose constipation based on whether constipation is present, which is an output value of the machine learning model. That is, the diagnosis unit 130 may determine whether the subject to be tested has constipation or predict the incidence of constipation of the subject to be tested based on the output value of the machine learning model.

Hereinafter, Examples of the present disclosure will be described in detail. However, the present disclosure is not limited thereto.

EXAMPLES

Example 1. Microbe-Related Feature Selected Based on Recursive Feature Elimination Algorithm after or without MCMOD Treatment In order to check microbe-related features selected based on a recursive feature elimination algorithm after or without MCMOD treatment of Example 1, a test was performed as follows.

According to the present disclosure, a pre-treatment is performed to analyze a mixture of a sample and a gut environment-like composition. In the present disclosure, the above-described pre-treatment may be referred to as MCMOD. Meanwhile, in the present disclosure, Comparative Example relates to a method for determining constipation based on microbial data extracted by performing only a conventional pre-treatment without performing the above-described pre-treatment on a sample. In this regard, the conventional pretreatment for Comparative Example is referred to as SMOD.

As shown in Table 1 below, samples were microbial data from MCMOD and SMOD of a simple clinical data set (feces) based on questionnaire results received from 17 constipation patients (disease group) and 82 normal people (normal group). In particular, oversampling and undersampling were performed on the data set to reduce class imbalance, and the data set was transformed into a total of 90 data sets including 48 normal data and 42 constipation data.

analysis results according to a method for diagnosing the presence or absence of constipation of an example of the present disclosure and a method of a comparative example. As a result of checking the number of features suitable for model prediction, the number of features for the MCMOD was 12 to 20 and the number of features for the SMOD was 1 to 10.

FIG. 6A, FIG. 6B, FIG. 6C and FIG. 6D are diagrams for explaining the importance of selected microbe-related features.

Multiple microbe-related features selected through the XGB model may be selected.

FIG. 6A, FIG. 6B, FIG. 6C and FIG. 6D show 17 microbe-related features with high accuracy for the MCMOD and 12 microbe-related features with high accuracy for the SMOD among the multiple microbe-related features selected based on the importance and values of gain, respectively.

For example, in the MCMOD, a microbe-related feature with high accuracy among the multiple selected microbe-related features may be a microbe belonging to the genus *Eubacterium* in the family Lachnospiraceae.

Comparative Example 1. Analysis Results of Feces Samples Treated with MCMOD and Feces Samples not Treated with MCMOD Feces were collected from one subject for 8 days, and 8 feces samples (J01, J02, J03, J04, J06, J08, J09 and J10) sorted by date were treated with MCMOD and then subjected to next-generation sequencing to analyze genes of microbes (Example). Similarly, feces samples not treated with MCMOD were subjected to next-generation sequencing to analyze genes of microbes (Comparative Example).

Figure 7A:
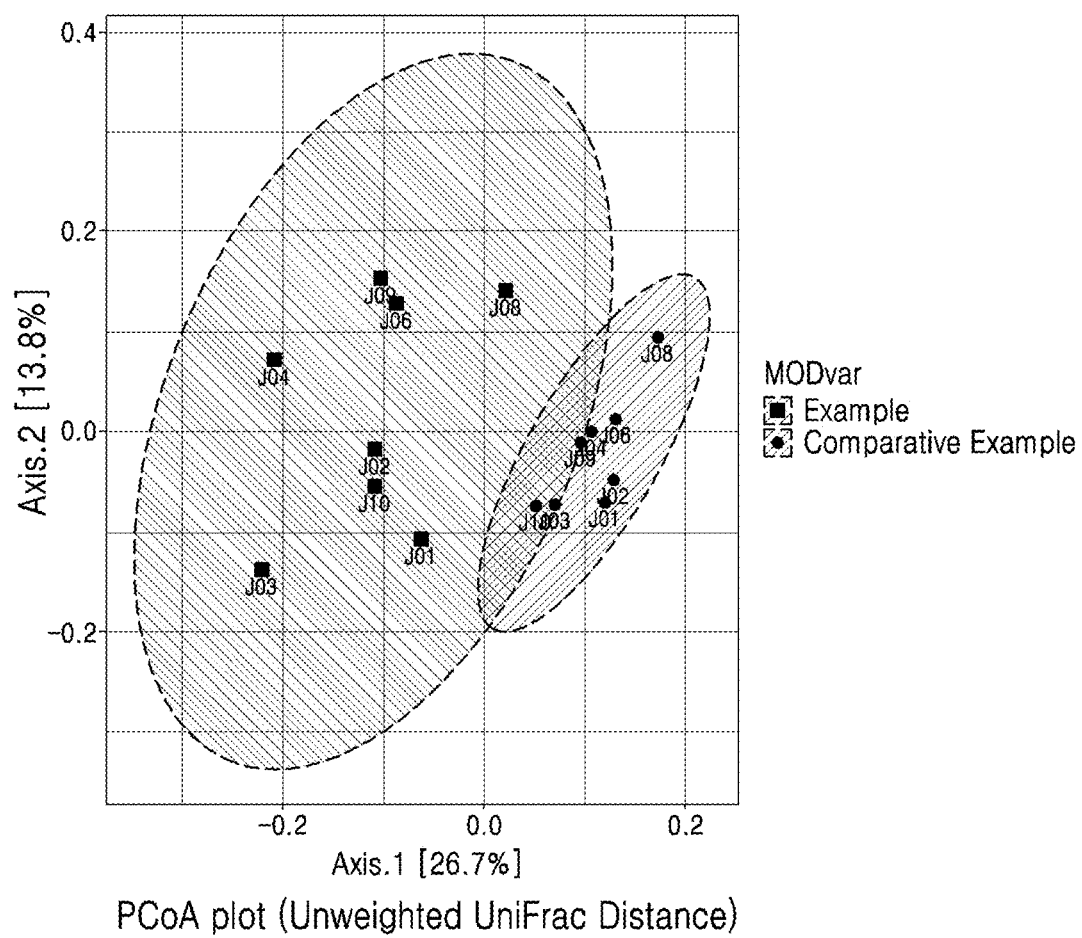
FIG. 7A is a diagram comparing analysis results of respective samples according to the method for diagnosing the presence or absence of constipation of the example of the present disclosure and the method of the comparative example.
Figure 7B:
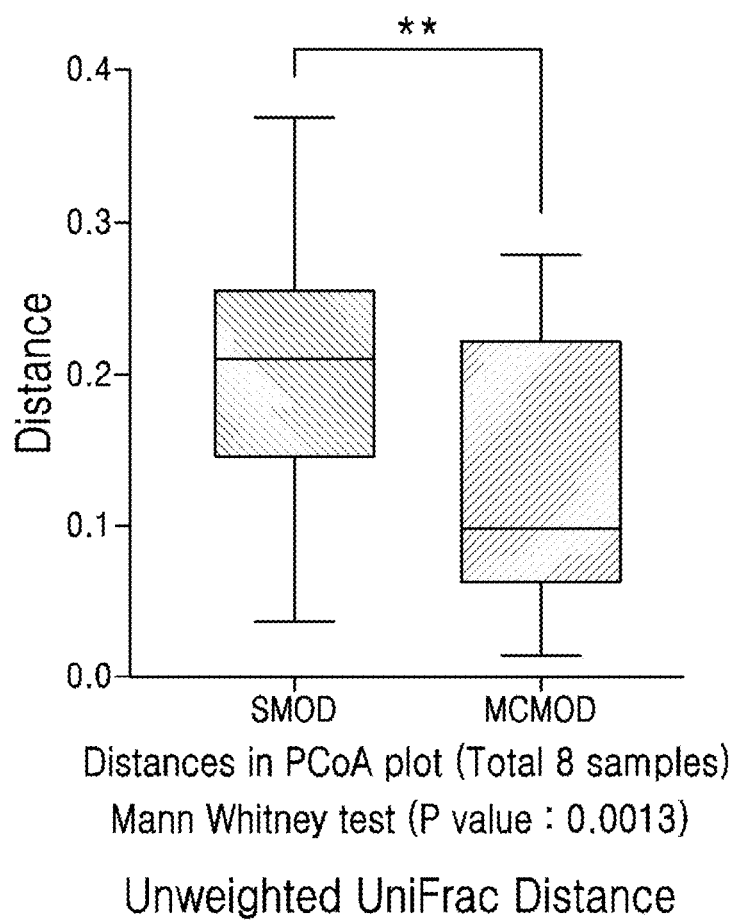
FIG. 7B is a diagram comparing analysis results of respective samples according to the method for diagnosing the presence or absence of constipation of the example of the present disclosure and the method of the comparative example.
Figure 7C:
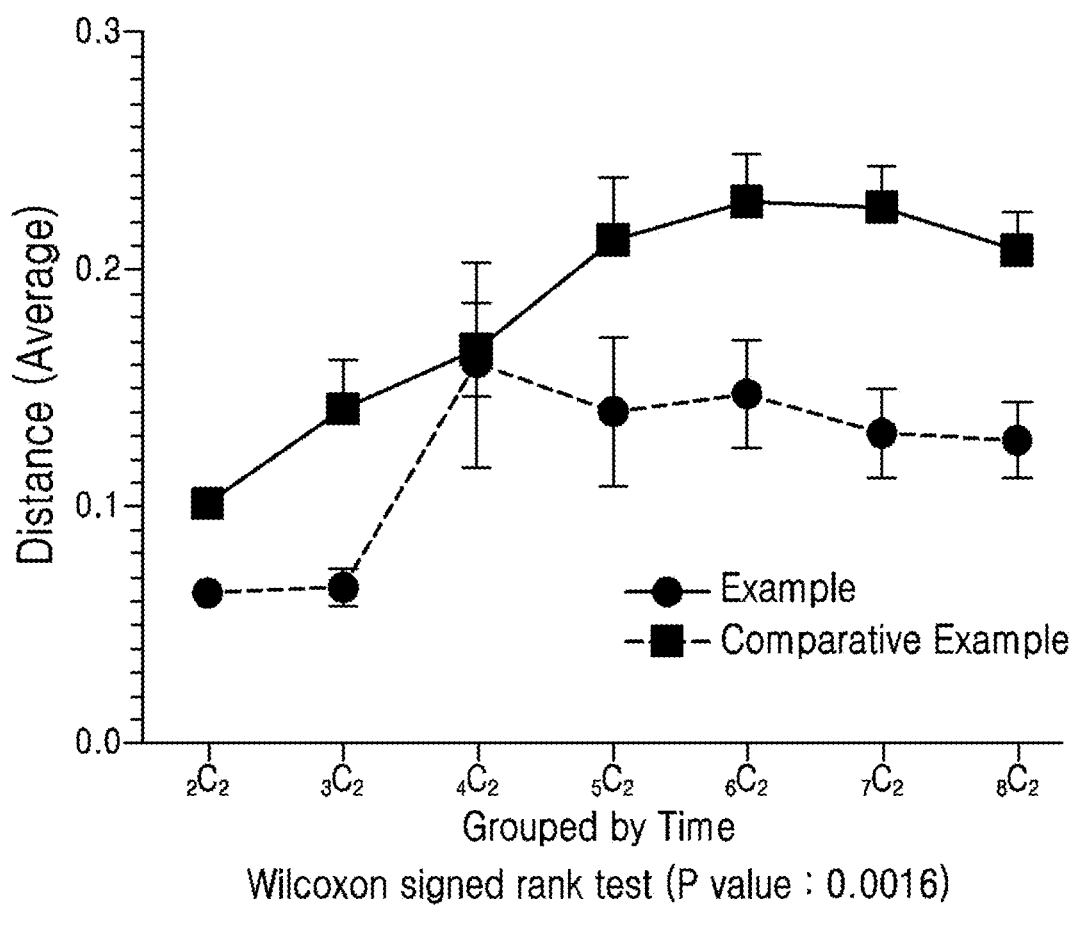
FIG. 7C is a diagram comparing analysis results of respective samples according to the method for diagnosing the presence or absence of constipation of the example of the present disclosure and the method of the comparative example.
Figure 8A:
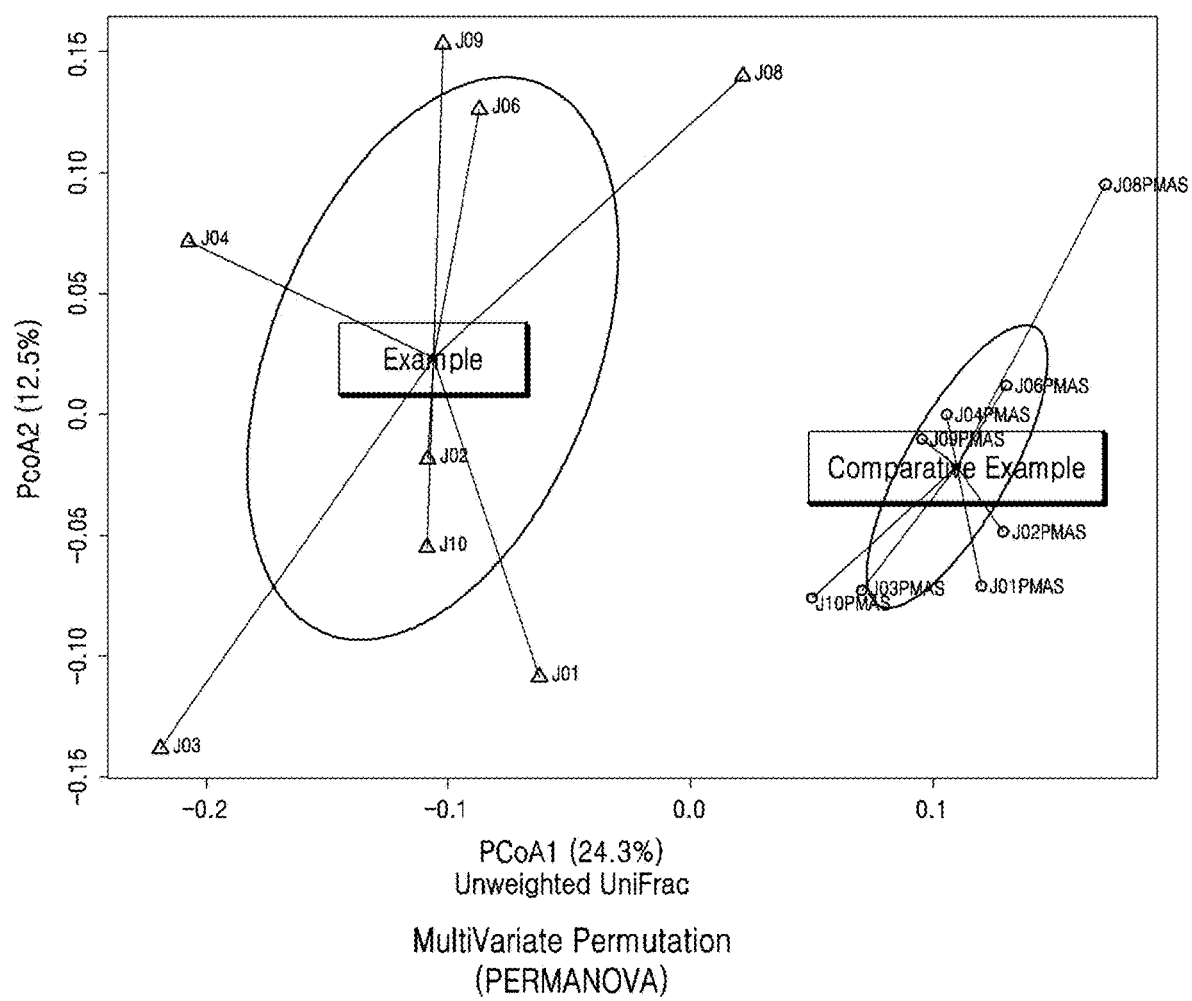
FIG. 8A is a diagram comparing analysis results of respective samples according to the method for diagnosing the presence or absence of constipation of the example of the present disclosure and the method of the comparative example.

FIG. 7A, FIG. 7B, and FIG. 7C are diagrams comparing analysis results of respective samples according to a method for diagnosing the presence or absence of constipation of an example of the present disclosure and a method of Comparative Example, and FIGS. 8A and 8B are diagrams comparing analysis results of respective samples according to the method for diagnosing the presence or absence of constipation of an example of the present disclosure and the method of Comparative Example.

TABLE 1

| | | | | | Number of Samples from | | | Oversampled Data | | | | | |
| --- | --- | --- | --- | --- | --- | --- | --- | --- | --- | --- | --- | --- | --- |
| Disease and | | Data Source | Criteria | | Original Data | | | Train set | | | Test set | | |
| Examination Item | Classification | (Collection Route) | for Disease | MOD | Disease Group | Normal Group | Total | Disease Group | Normal Group | Total | Disease Group | Normal Group | Total |
| Constipation | Test Result Sheet | HEM Service Beta-tester | Self-response | MCMOD | 17 | 82 | 99 | 33 | 35 | 68 | 9 | 13 | 22 |
| | | | | SMOD | 17 | 82 | 99 | 31 | 37 | 68 | 11 | 11 | 22 |

Microbial data were classified into training data (Train set) to be used for learning and test data (Test set) at a ratio of 7:3.

Then, feature selection was performed on the training data through the Boruta algorithm, the binomial deviance plot, and the XGB model to select microbe-related features to be used in the machine learning model. Meanwhile, as will be described below, the test data were used to assess the performance of the machine learning model.

Figure 5A:
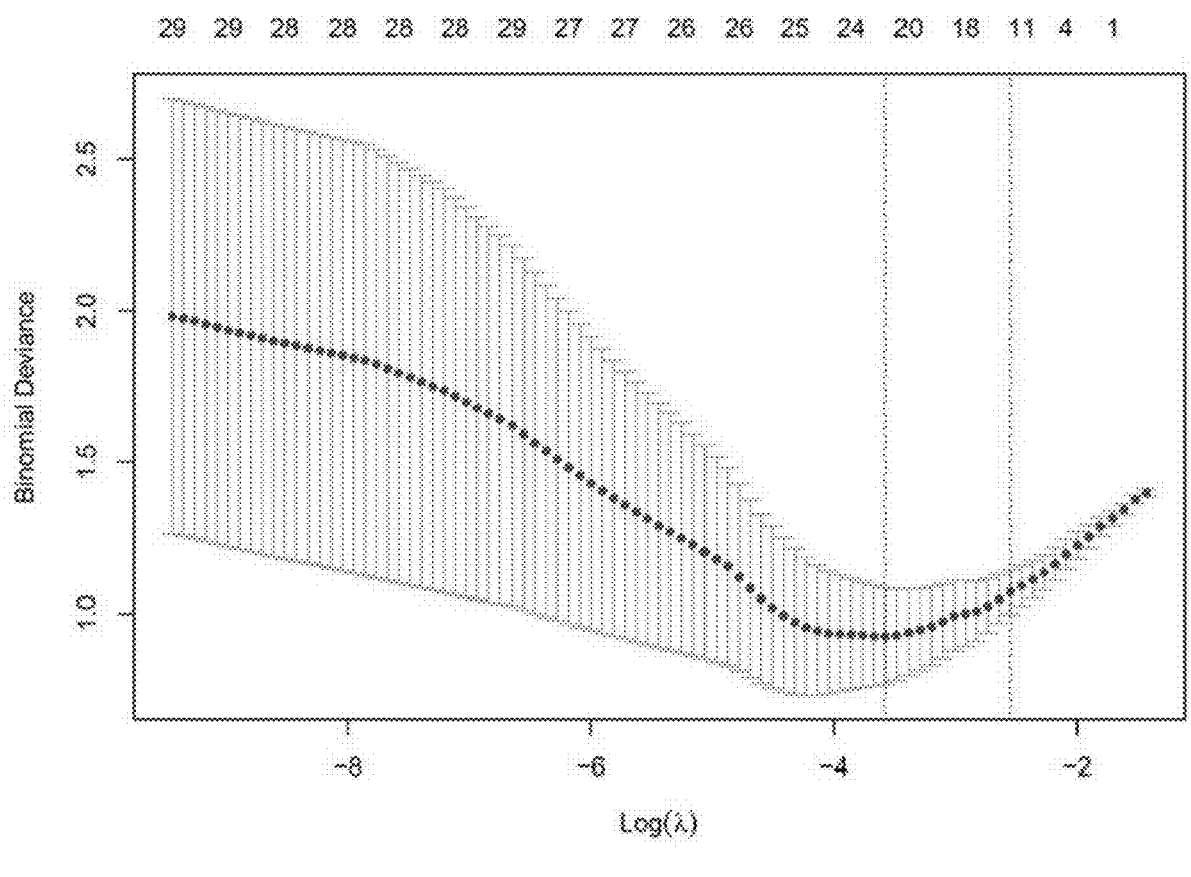
FIG. 5A is a diagram showing an optimal range of the number of features by checking an error value depending on the number of features through a binomial deviance plot of analysis results according to a method for diagnosing the presence or absence of constipation of an example of the present disclosure.
Figure 5B:
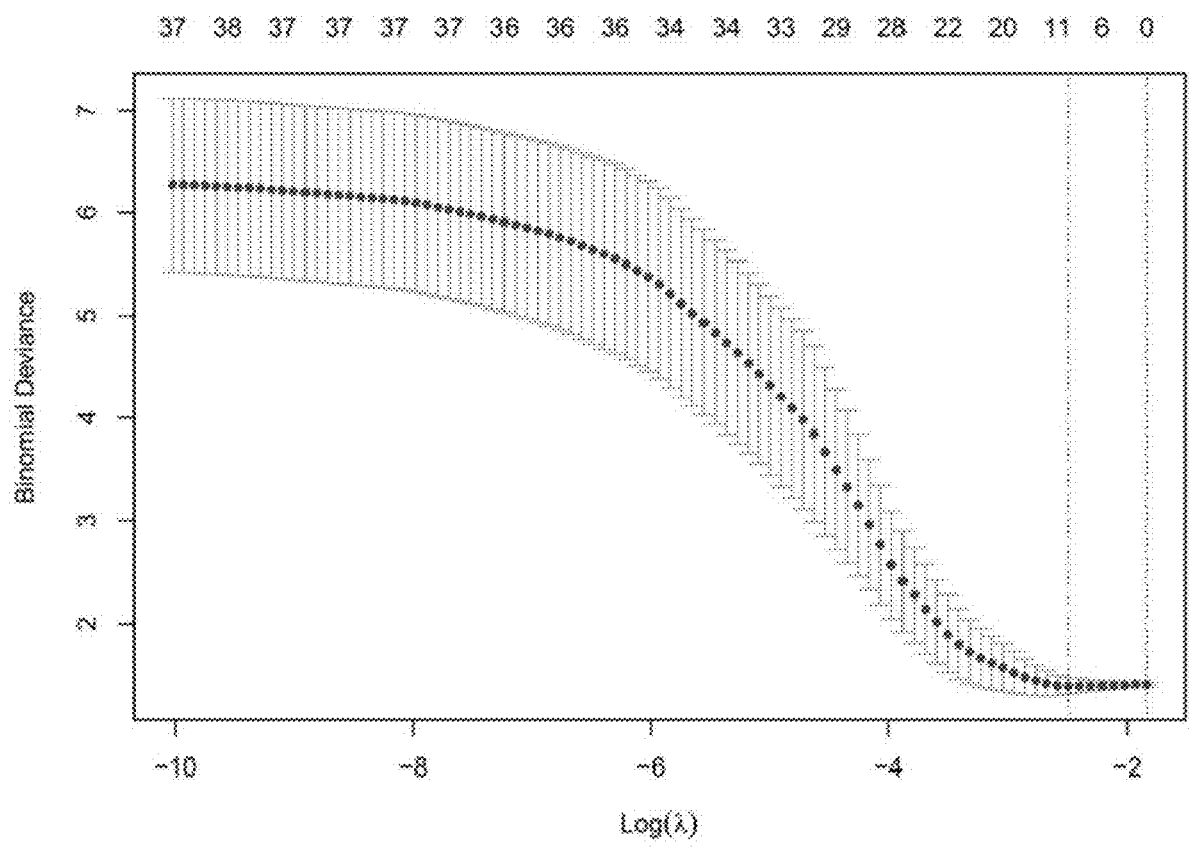
FIG. 5B is a diagram showing an optimal range of the number of features by checking an error value depending on the number of features through a binomial deviance plot of analysis results according to a method for diagnosing the presence or absence of constipation of comparative example.
Figure 6A:
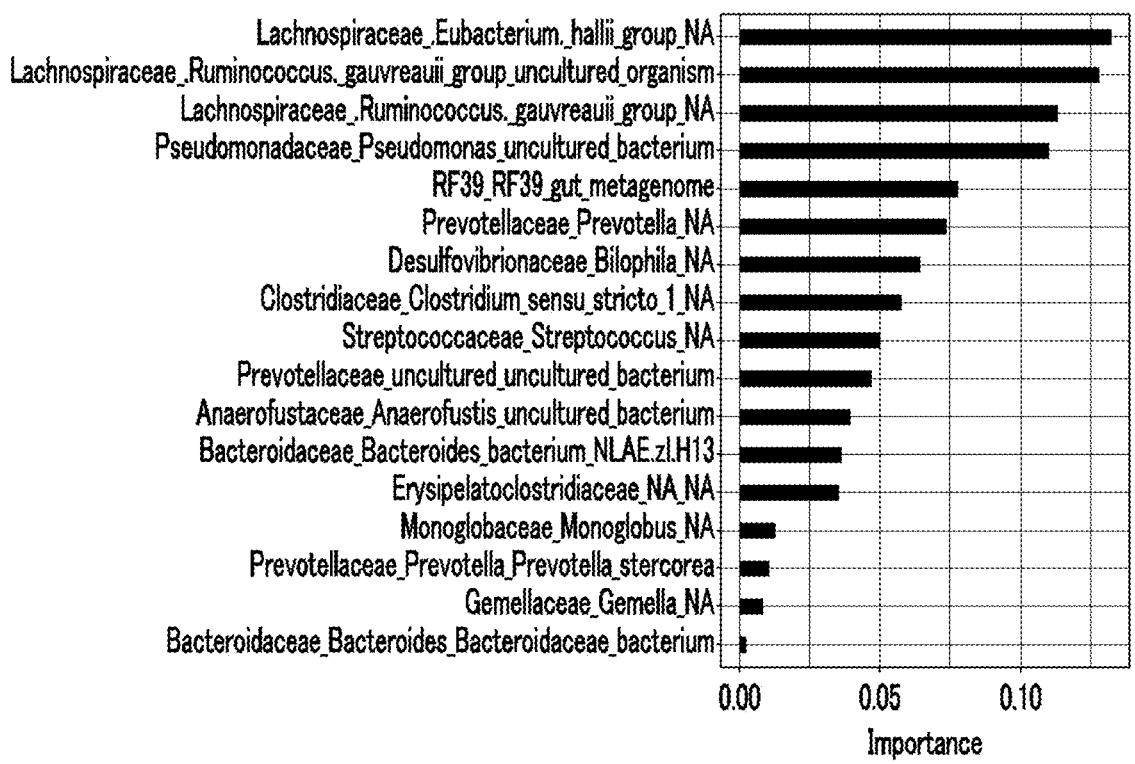
FIG. 6A is a diagram for explaining the importance of selected microbe-related features.
Figure 6B:
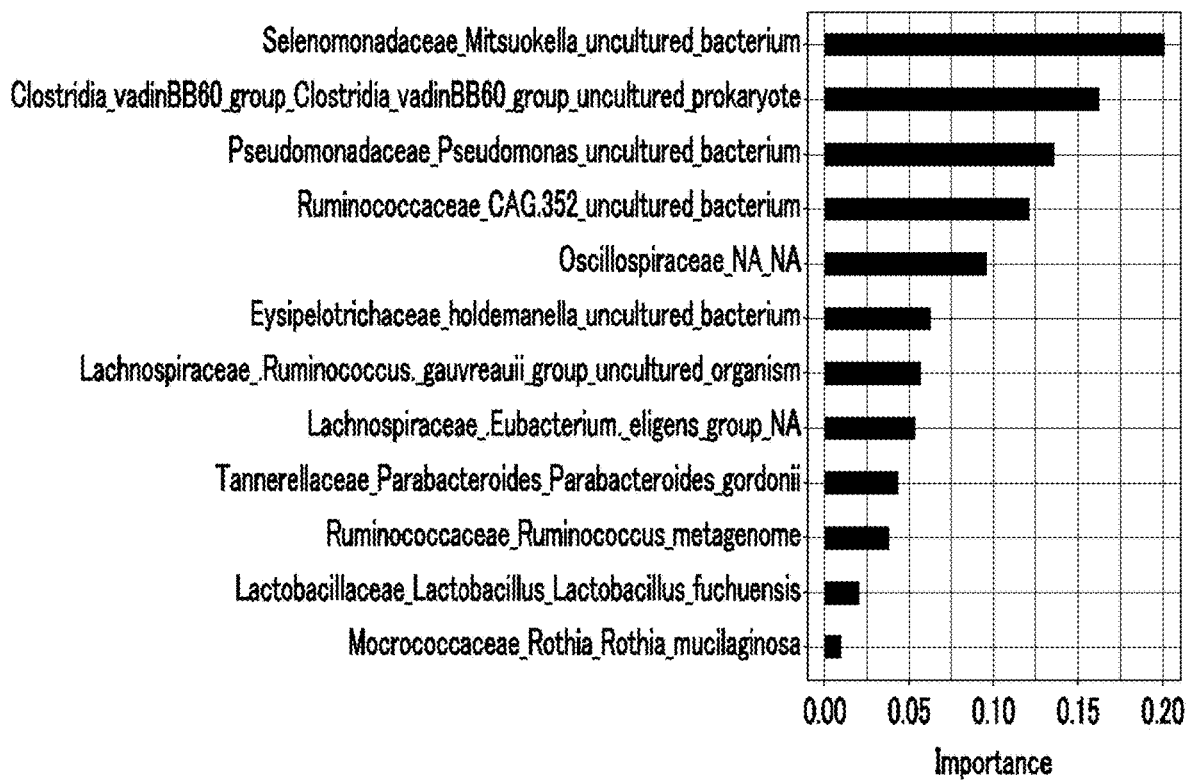
FIG. 6B is a diagram for explaining the importance of selected microbe-related features.

FIG. 5A and FIG. 5B show an optimal range of the number of features by checking an error value depending on the number of features through a binomial deviance plot of FIG. 7A shows, as a PCoA plot, the beta diversity of the feces sample by using the Unweighted Unifrac Distance. As shown in the PCoA plot of FIG. 7A, it can be seen that the feces samples treated with MCMOD are relatively clustered, whereas the feces samples not treated with MCMOD are relatively scattered.

FIG. 7B shows, as a box plot, the distances among 8 points in each group (Example and Comparative Example) on the PCoA plot.

As can be seen from the box plot, the differences among the feces samples of Example are statistically significantly smaller than those of Comparative Example.

FIG. 7C shows the distances among 8 points in each group (Example and Comparative Example) on the PCoA plot.

Since there are 8 samples in each group, each group has a total of 28 types of distances between two samples. The samples with 28 types of distances were grouped in chronological order from $_2C_2$ to $_8C_2$.

Since a feces sample J01 was collected first and a feces sample J10 was collected last, the distance between the two samples collected first and second in the group $_2C_2$ (N=1) (the distance between the samples J01 and J02) was calculated.

In the group $_3C_2$ (N=3), the distances among the three samples including the next collected feces sample J03 (between J01 and J02, between J01 and J03, and between J02 and J03) were calculated to find the average and standard error of the distances.

In the group $_4C_2$ (N=6), the distances among the four samples including the next collected feces sample J04 (between J01 and J02, between J01 and J03, between J01 and J04, between J02 and J03, between J02 and J04, and between J03 and J04) were calculated to find the average and standard error of the distances.

Similarly, in the group $_8C_2$ (N=28), the distances among the eight samples including the last collected feces sample J10 (a total of 28 types of distances) were calculated to find the average and standard error of the distances.

As can be seen from the distance values in the PCoA plot, the differences among the feces sample groups ($_2C_2$ to $_8C_2$) of Example are statistically significantly smaller than those of Comparative Example.

FIGS. 8A and 8B show analysis results of the two groups (Example and Comparative Example) through PERMANOVA tests.

Based on the result of PERMANOVA tests as shown in FIG. 8B, a Pr(>F) value is as small as 0.001, which indicates that the two groups (Example and Comparative Example) are different in terms of population mean. This means there is a statistically significant difference between the two groups.

Also, it can be seen that the average distance to median of each feces sample in each group is smaller in Example (0.1792) than in Comparative Example (0.2340), which means that Example has less noise than Comparative Example.

As described above, the feces samples treated with MCMOD have relatively little noise due to a small bias between the feces samples and thus have low fluctuations.

That is, according to the present disclosure, the feces samples are treated with MCMOD before feature selection and machine learning training to facilitate feature selection, and, as will be described later, the machine learning model is trained to improve the performance of the machine learning model.

Comparative Example 2. Comparison of Performance Between Machine Learning Models Trained with Training Data Obtained from MCMOD-Treated Fecal Sample and Non-Treated Fecal Sample, Respectively The fecal sample collected in Example 1 was subjected to the MCMOD to extract microbial data (Example), and microbial data were extracted without the MCMOD (Comparative Example).

Specifically, as described above, after primary selection was made from among all 978 features through the Boruta algorithm, the optimal number of features was set through a binomial distribution deviation plot and multiple microbe-related features was selected through the XGB model.

The microbe data and microbe-related features of Example and Comparative Example were used to train each of the LRA model, the random forest model, the GLM model, the gradient boosting model and the XGB model and then assess the performance of each machine learning model.

Figure 9A:
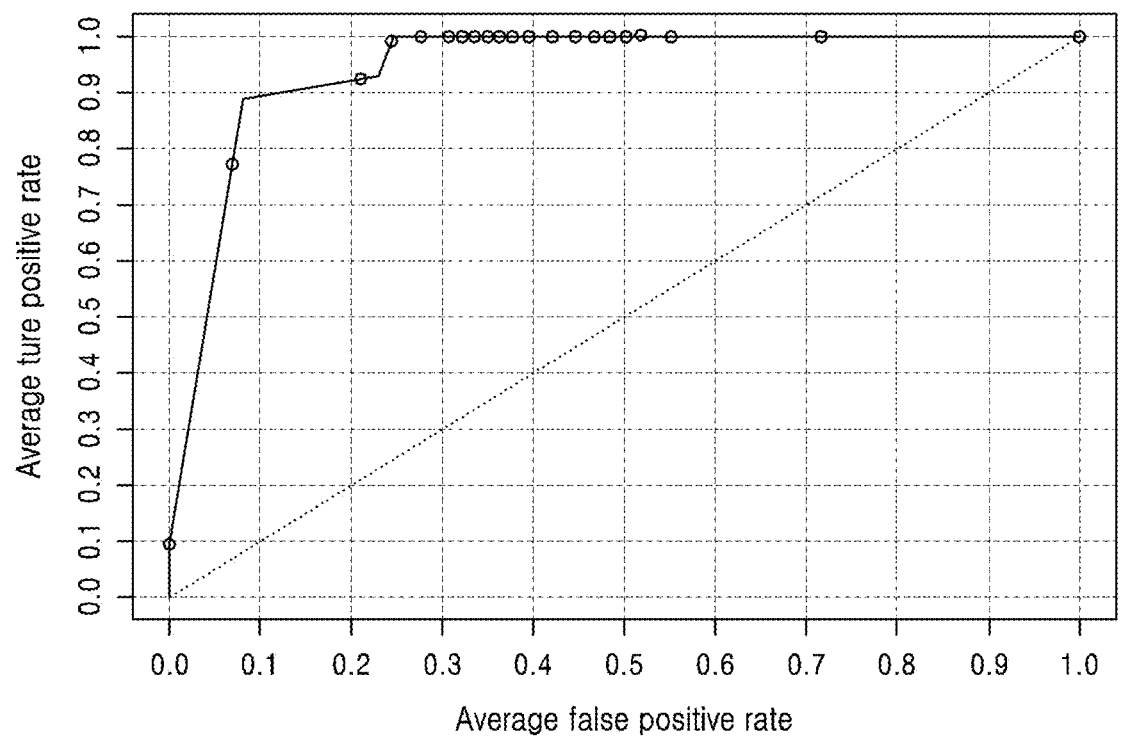
FIG. 9A shows an ROC (receiver operating characteristic) curve and AUC (area under an ROC curve) scores for each of XGB models according to the method for diagnosing the presence or absence of constipation of the method of the comparative example.
Figure 9B:
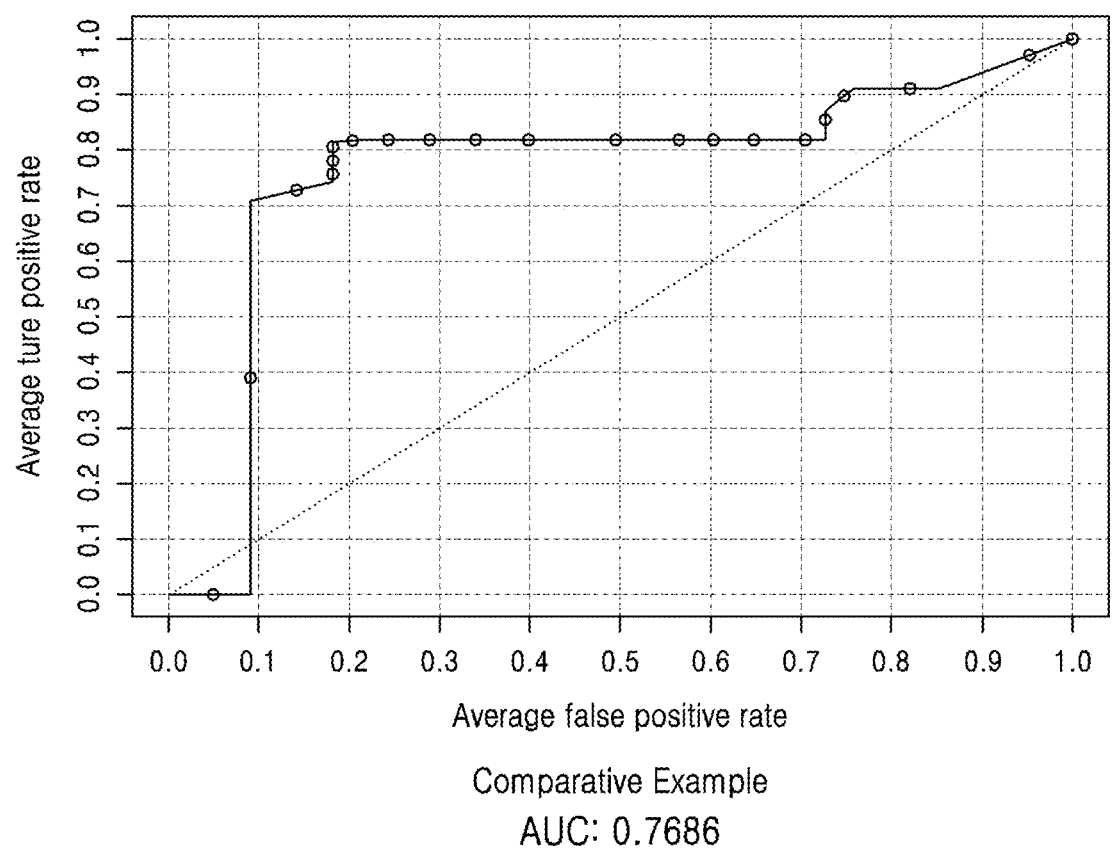
FIG. 9B shows an ROC (receiver operating characteristic) curve and AUC (area under an ROC curve) scores for each of XGB models according to the method for diagnosing the presence or absence of constipation of the comparative example.
Figure 11A:
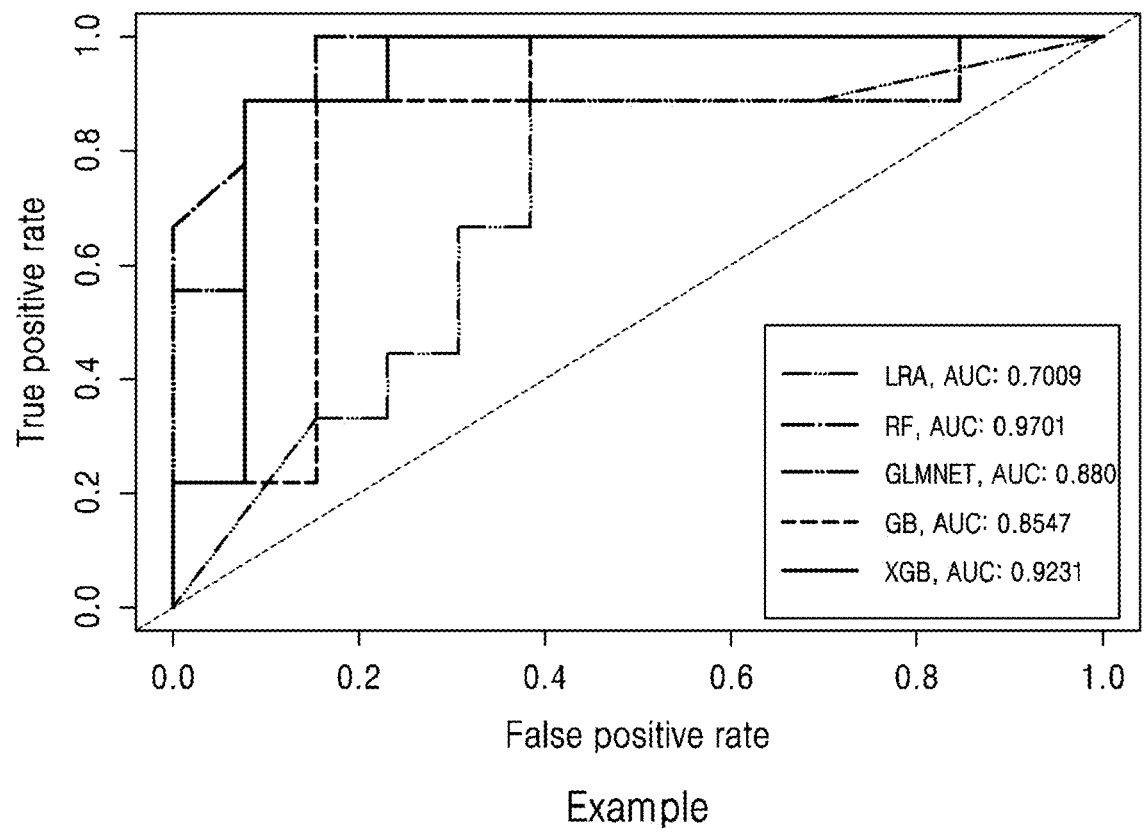
FIG. 11A is a diagram comparing machine learning models in terms of performance according to the method for diagnosing the presence or absence of constipation of the example of the present disclosure.
Figure 11B:
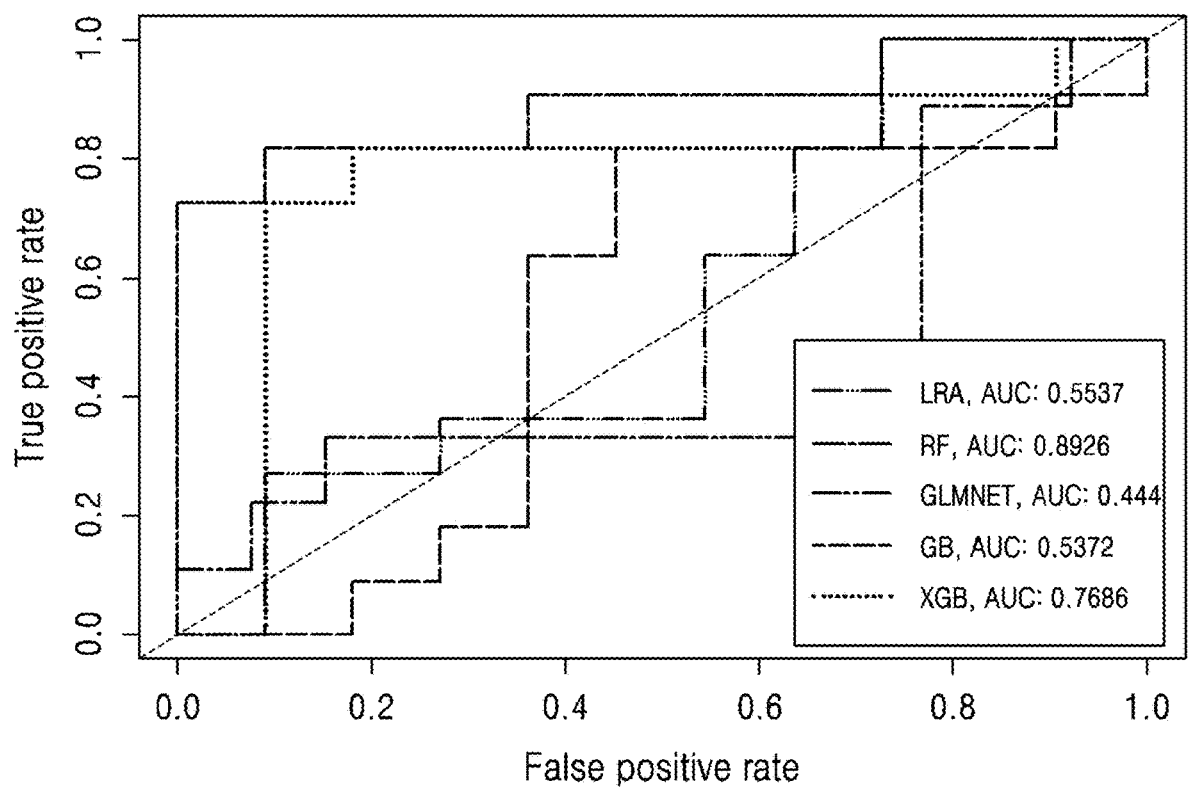
FIG. 11B is a diagram comparing machine learning models in terms of performance according to the method for diagnosing the presence or absence of constipation of the comparative example.
Figure 12A:
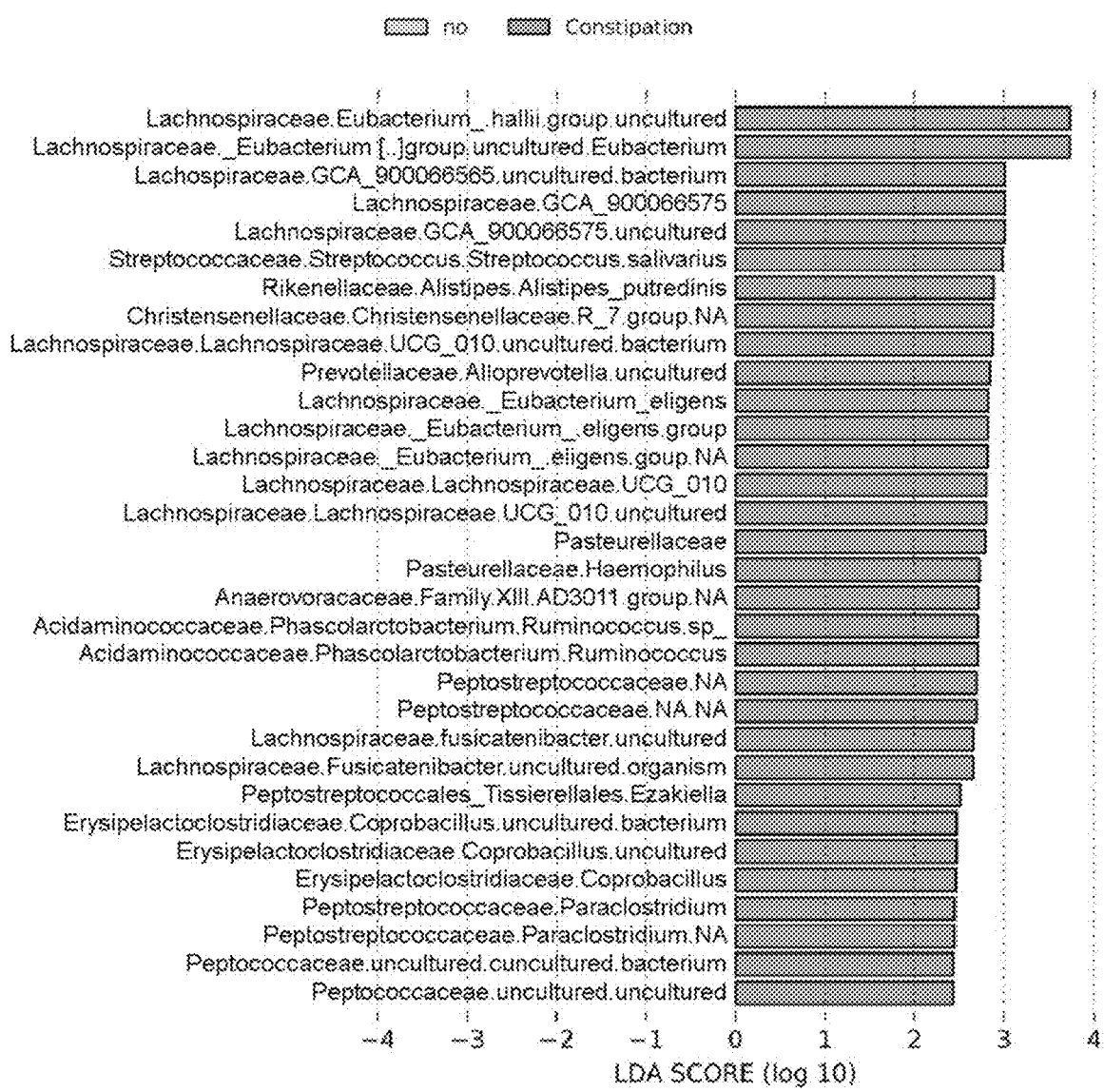
FIG. 12A is a diagram showing linear discriminant analysis effect sizes (LEfSe) according to the method for diagnosing the presence or absence of constipation of the method of the comparative example.
Figure 12B:
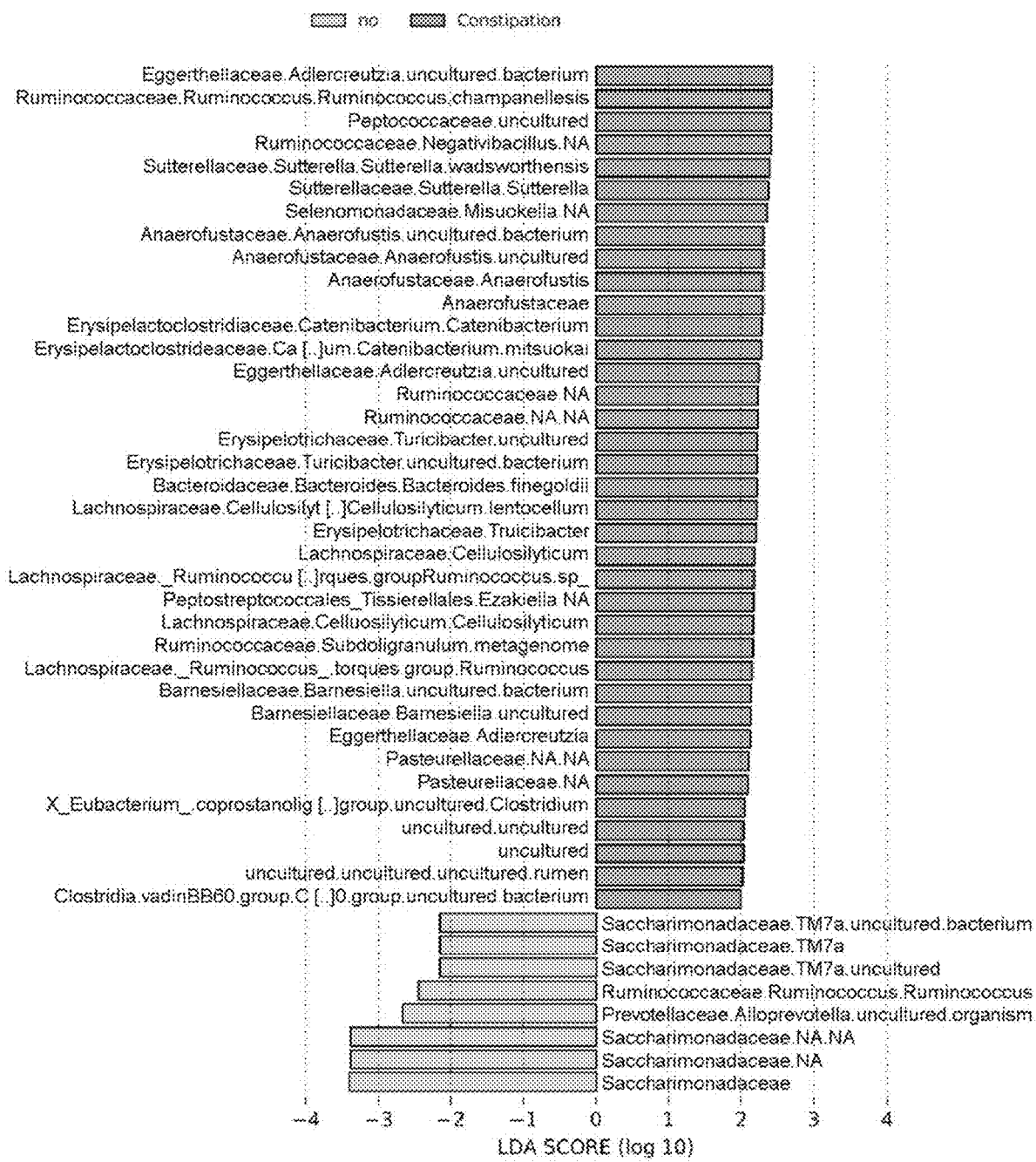
FIG. 12B is a diagram showing linear discriminant analysis effect sizes (LEfSe) according to the method for diagnosing the presence or absence of constipation of the comparative example.
Figure 12C:
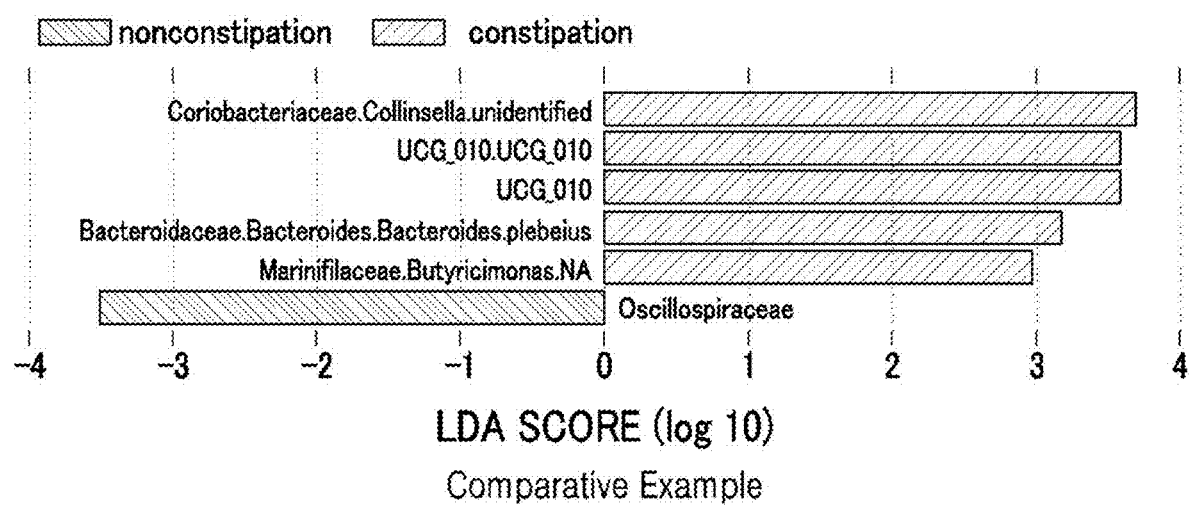
FIG. 12C is a diagram showing linear discriminant analysis effect sizes (LEfSe) according to the method for diagnosing the presence or absence of constipation of the comparative example.
Figure 13A:
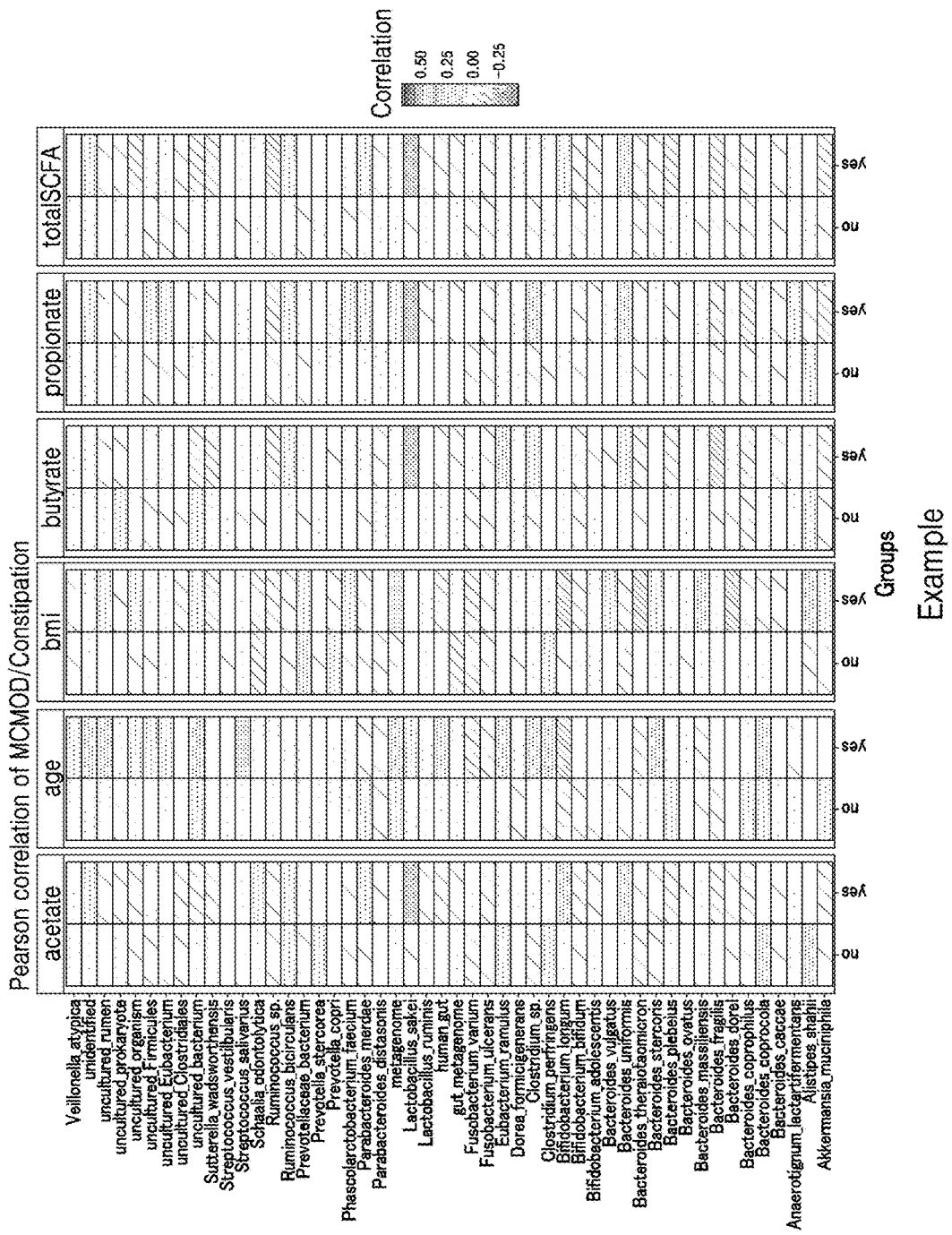
FIG. 13A is a diagram showing a Pearson's correlation with respect to a microbe distribution chart according to the determination method of the example of the present disclosure.
Figure 13B:
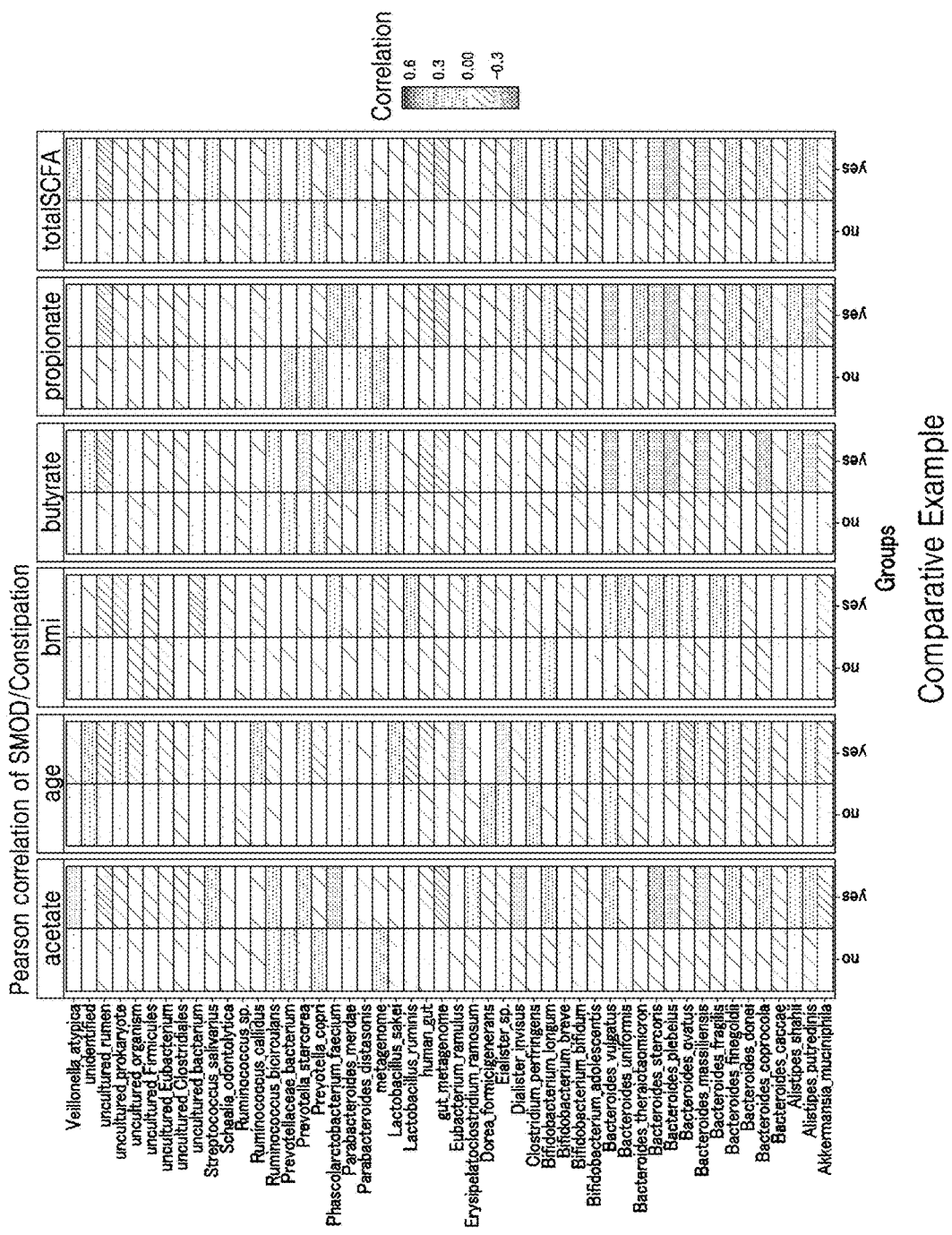
FIG. 13B is a diagram showing a Pearson's correlation with respect to a microbe distribution chart according to the determination of the method of the comparative example.
Figure 14A:
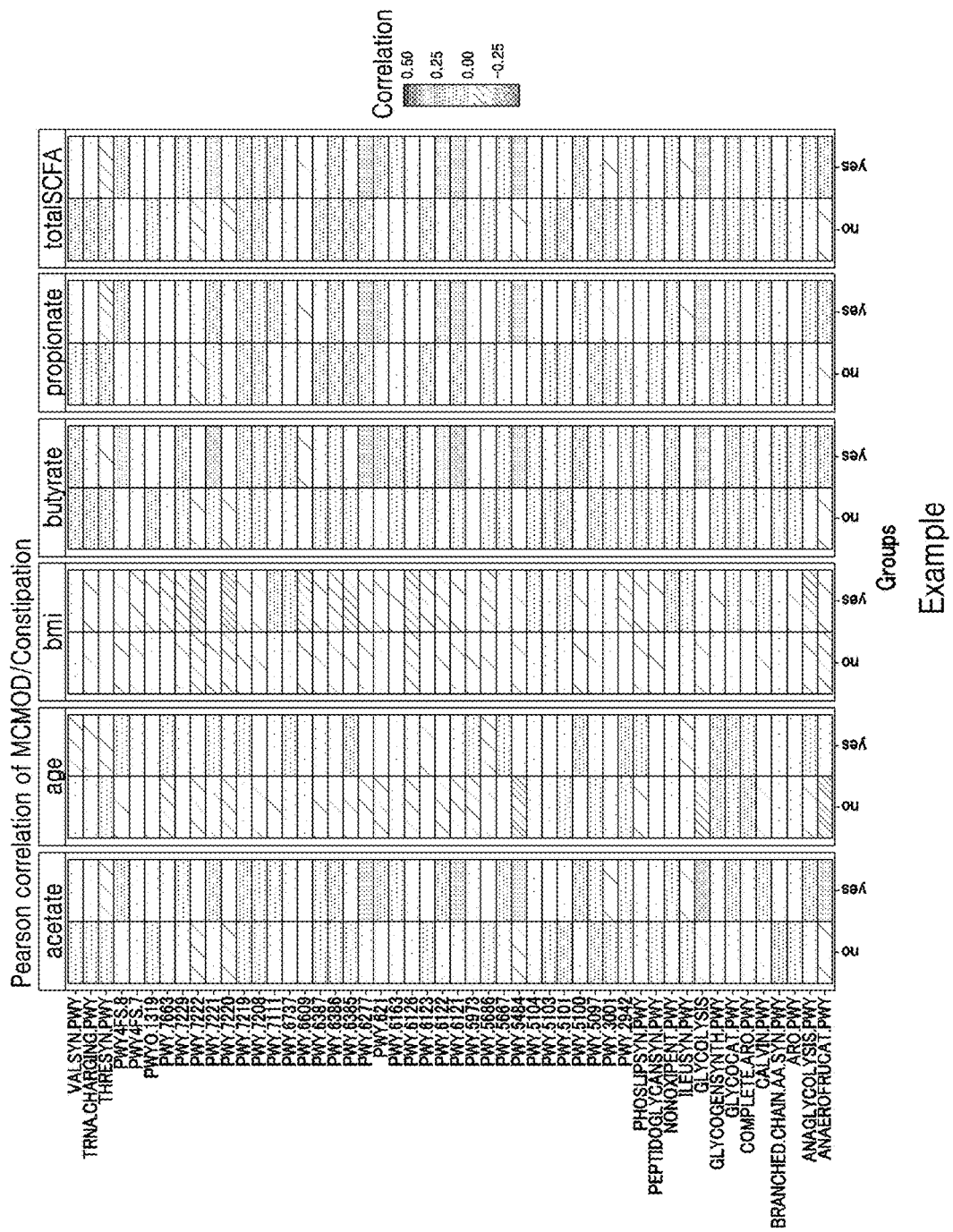
FIG. 14A is a diagram showing a Pearson's correlation with respect to each gene pathway prediction according to the method for diagnosing the presence or absence of constipation of the example of the present disclosure.
Figure 14B:
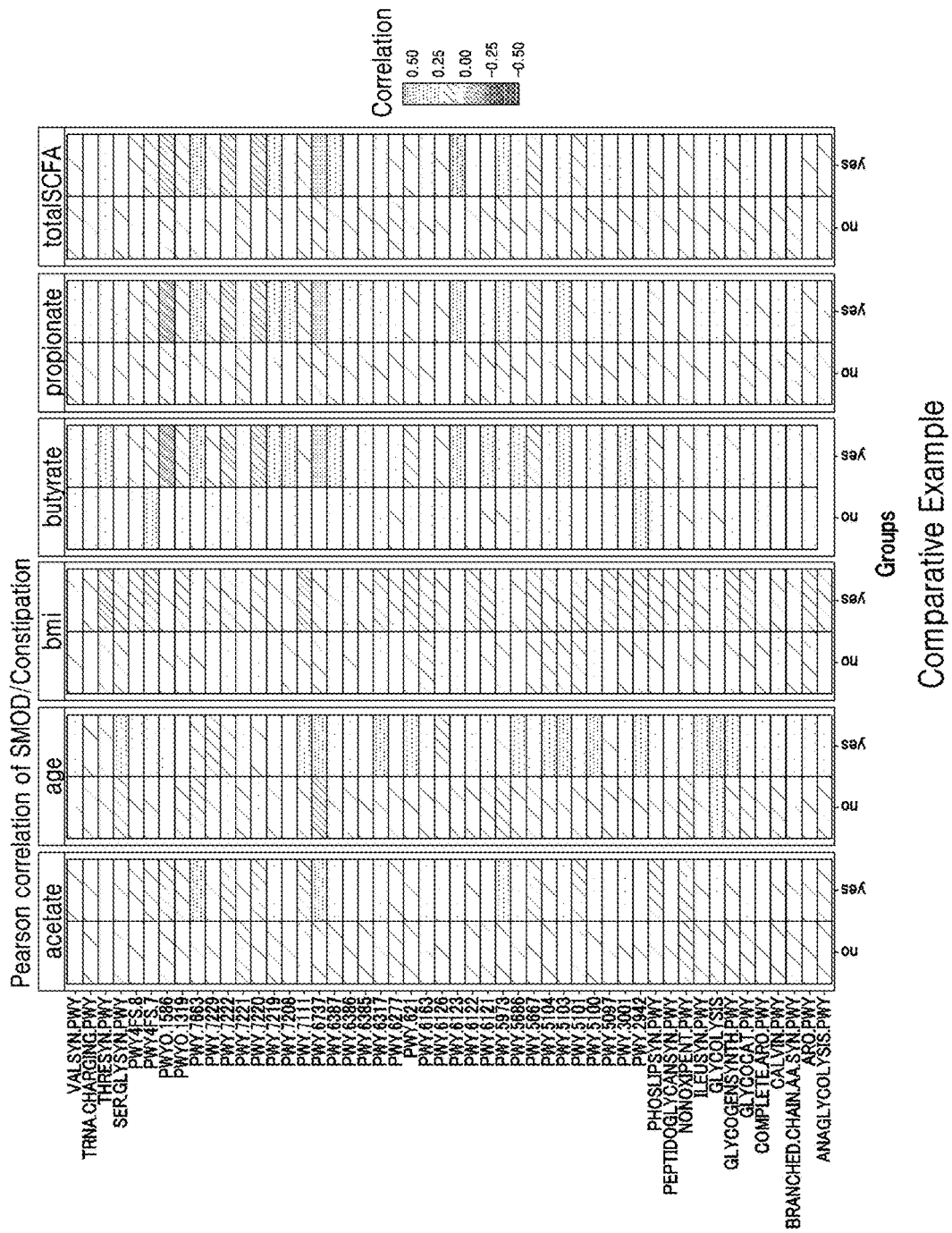
FIG. 14B is a diagram showing a Pearson's correlation with respect to each gene pathway prediction according to the method for diagnosing the presence or absence of constipation of the comparative example.
Figure 15A:
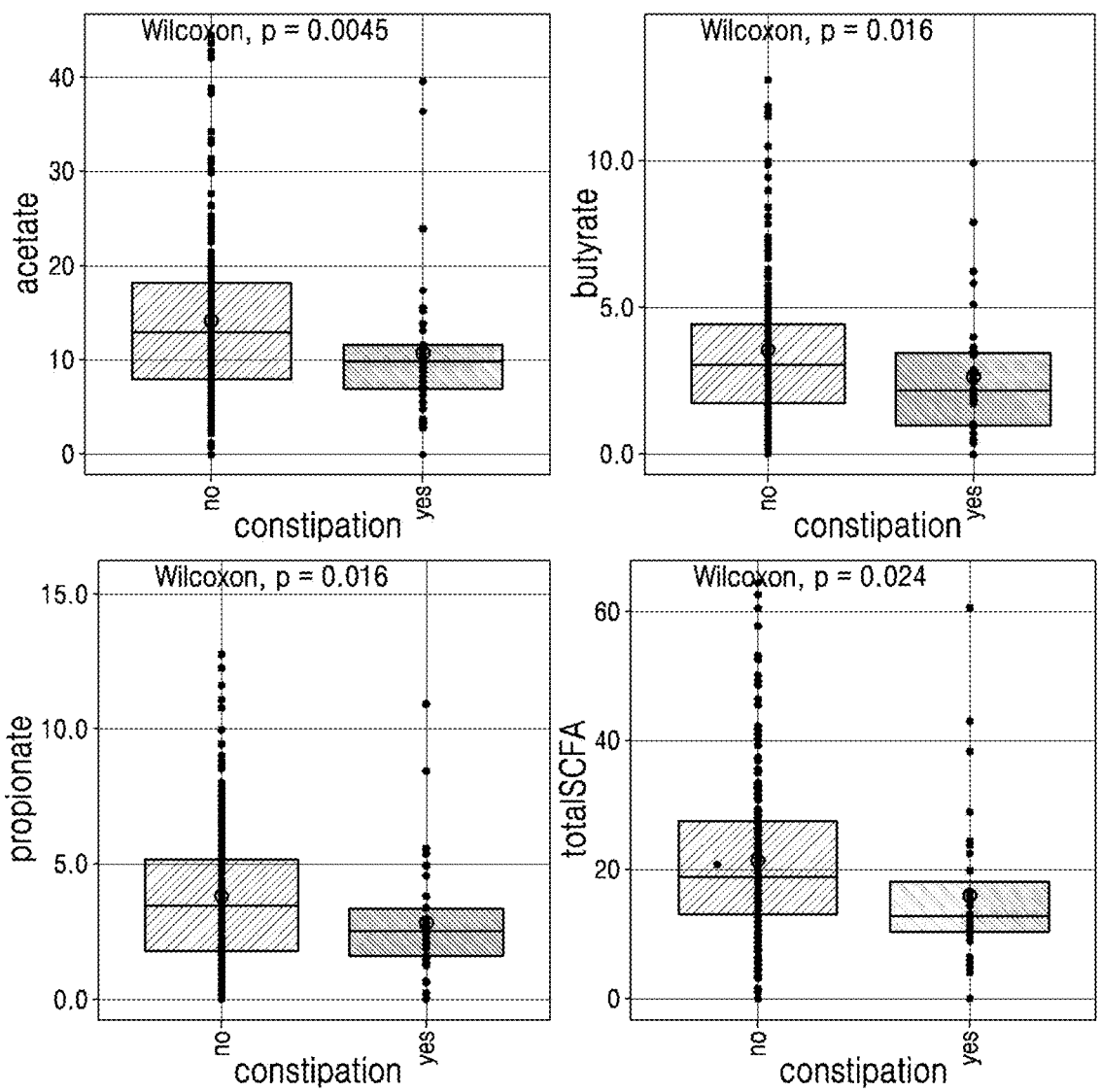
FIG. 15A is a diagram comparing the amounts of short-chain fatty acids (SCFAs) according to the method for diagnosing the presence or absence of constipation of the example of the present disclosure.
Figure 15B:
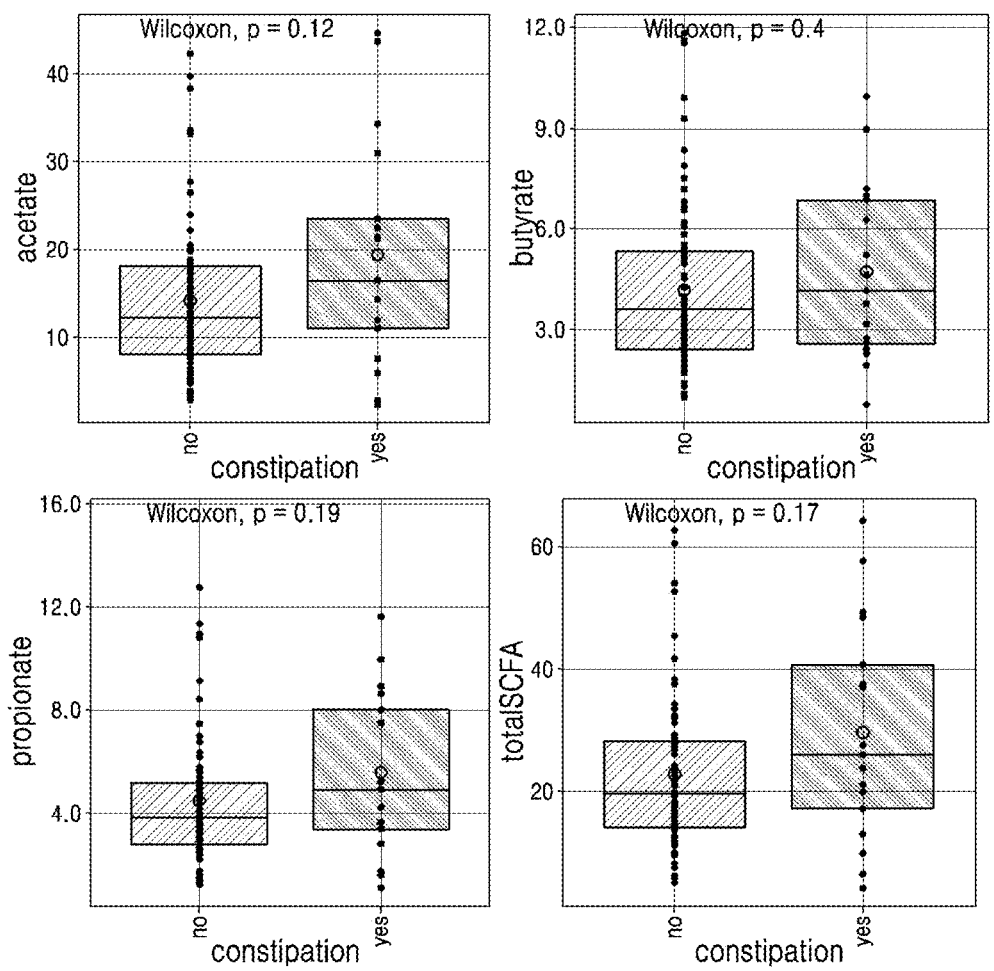
FIG. 15B is a diagram comparing the amounts of short-chain fatty acids (SCFAs) according to the method for diagnosing the presence or absence of constipation of the comparative example.

FIG. 9A and FIG. 9B show an ROC (receiver operating characteristic) curve and AUC (area under an ROC curve) scores for each of XGB models according to the method for diagnosing the presence or absence of constipation of the example of the present disclosure and the method of the comparative example. FIG. 10A and FIG. 10B are diagrams comparing the XGB models in terms of performance according to the method for diagnosing the presence or absence of constipation of the example of the present disclosure and the method of the comparative example. FIG. 11A and FIG. 11B are diagrams comparing machine learning models in terms of performance according to the method for diagnosing the presence or absence of constipation of the example of the present disclosure and the method of the comparative example. FIG. 12A, FIG. 12B and FIG. 12C are a diagram showing linear discriminant analysis effect sizes (LEfSe) according to the method for diagnosing the presence or absence of constipation of the example of the present disclosure and the method of the comparative example. FIG. 13A and FIG. 13B are diagrams showing a Pearson's correlation with respect to a microbe distribution chart according to the method for diagnosing the presence or absence of constipation of the example of the present disclosure and the method of the comparative example. FIG. 14A and FIG. 14B are diagrams showing a Pearson's correlation with respect to each gene pathway prediction according to the method for diagnosing the presence or absence of constipation of the example of the present disclosure and the method of the comparative example. FIG. 15A and FIG. 15B are a diagram comparing the amounts of short-chain fatty acids (SCFAs) according to the method for diagnosing the presence or absence of constipation of the example of the present disclosure and the method of the comparative example.

Referring to FIG. 9A, FIG. 9B, FIG. 11A and FIG. 11B, the average true positive rate, the average false positive rate, the accuracy and the AUC values were higher in Example than in Comparative Example. It can be seen that when the microbe data of Example rather than Comparative Example were used, constipation determination performance of the XGB model was enhanced.

FIG. 11A and FIG. 11B show an ROC curve and AUC scores for each machine learning model. As shown in FIG. 11A and FIG. 11B, it can be seen that when machine learning models were trained with the microbial data of Example, all the machine learning models of Example had higher performance than those of Comparative Example.

FIG. 12A, FIG. 12B and FIG. 12C show the differences among the microbes characteristically found in the disease group and the normal group. Referring to FIG. 12A, FIG. 12B and FIG. 12C, it can be seen that more microbial taxa were identified by LefSe analyzed in Example than in Comparative Example.

Therefore, it can be seen that it is possible to more clearly determine the difference between the normal group and the patient group in Example than in Comparative Example.

FIG. 13A and FIG. 13B compare Pearson's correlations among numerical data, such as microbial taxon abundance and age, body mass index (BMI), and acetate, propionate, butyrate and total short-chain fatty acid levels, of the data of Example and Comparative Example. FIG. 14A and FIG. 14B compare Pearson's correlations between each gene pathway abundance and the above-described numerical data. Referring to FIG. 13A, FIG. 13B, FIG. 14A and FIG. 14B, the Pearson's correlation in the data of Example is higher than that of Comparative Example. Thus, it can be seen that the method for diagnosing the presence or absence of constipation according to Example is more useful than the method for diagnosing the presence or absence of constipation according to Comparative Example.

FIG. 15A and FIG. 15B compare the amounts of short-chain fatty acids (SCFAs) in the data of Example and Comparative Example. In general, it is known that a greater absolute amount of SCFAs (acetate, propionate and butyrate) is more useful.

It can be seen that the amounts of SCFAs are greater in the disease group than in the normal group according to Comparative Example, whereas the average is higher in the normal group according to Example or the difference decreases compared to Comparative Example even if the amounts of SCFAs are greater in the disease group.

That is, it can be seen that interpretation of the results was distorted by data noise in Comparative Example, whereas interpretation of the results was more accurate in Example.

Figure 16:
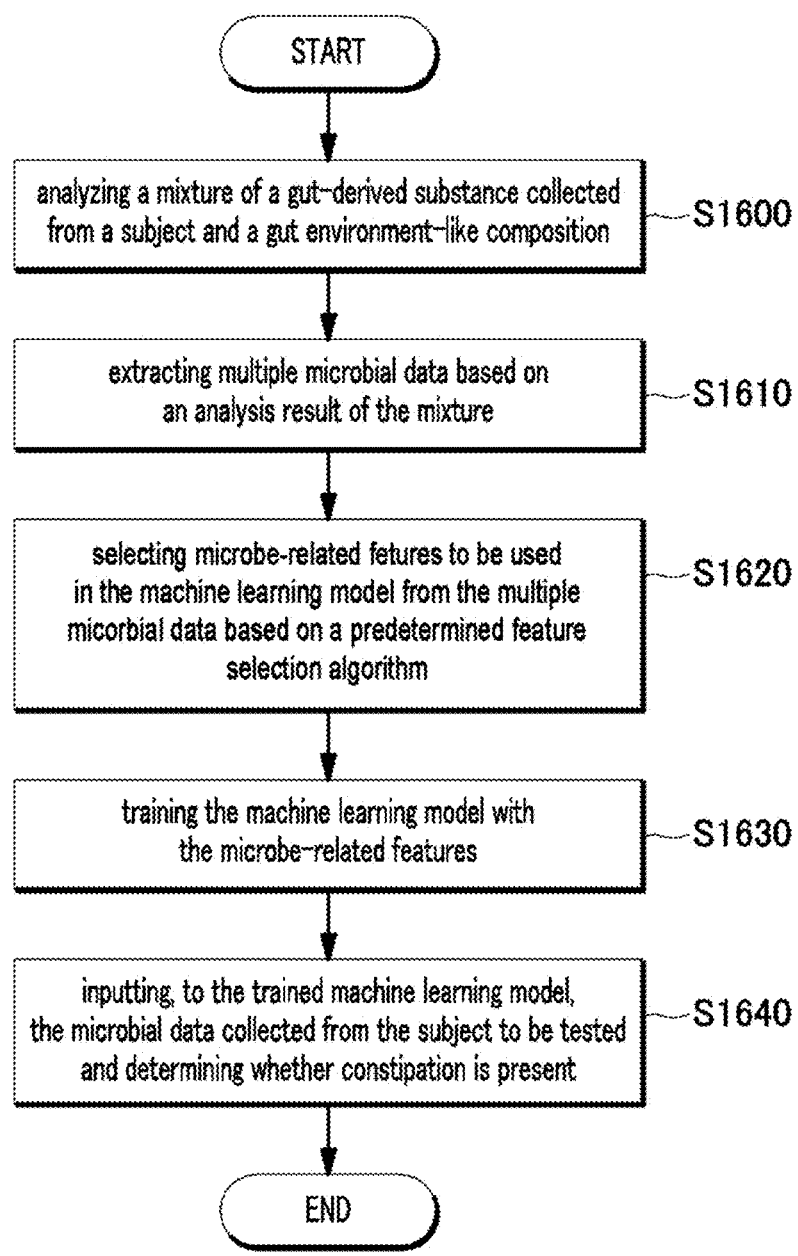
FIG. 16 is a flowchart showing a method for determining whether constipation is present according to an example of the present disclosure.

FIG. 16 is a flowchart illustrating a method for diagnosing the presence or absence of constipation according to an example of the present disclosure. The method for diagnosing the presence or absence of constipation according to the example illustrated in FIG. 16 includes the processes time-sequentially performed by the diagnostic apparatus illustrated in FIG. 1. Therefore, the above descriptions of the processes may also be applied to the method for diagnosing the presence or absence of constipation according to the example illustrated in FIG. 16, even though they are omitted hereinafter.

Referring to FIG. 16, a mixture of a gut-derived substance collected from a subject and a gut environment-like composition may be analyzed in a process S1600.

In a process S1610, multiple microbial data may be extracted based on an analysis result of the mixture.

In a process S1620, microbe-related features to be used in the machine learning model may be selected from the multiple microbial data based on a predetermined feature selection algorithm.

In a process S1630, the machine learning model may be trained with the microbe-related features.

In a process S1640, the microbial data collected from the subject to be tested may be input to the trained machine learning model, and whether constipation is present may be determined.

The presence or absence of constipation can be diagnosed by inputting microbial data collected from a test subject into the trained machine learning model.

The method for diagnosing the presence or absence of constipation illustrated in FIG. 16 can be embodied in a storage medium including instruction codes executable by a computer such as a program module executed by the computer. A computer-readable medium can be any usable medium which can be accessed by the computer and includes all volatile/non-volatile and removable/non-removable media. Further, the computer-readable medium may include all computer storage media. The computer storage media include all volatile/non-volatile and removable/non-removable media embodied by a certain method or technology for storing information such as computer-readable instruction code, a data structure, a program module or other data.

The above description of the present disclosure is provided for the purpose of illustration, and it would be understood by a person with ordinary skill in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A method for diagnosing the presence or absence of constipation by using a machine learning model, the method comprising:
   a process of analyzing a mixture of a gut-derived substance collected from a subject and a gut environment-like composition;
   a process of extracting microbial data based on an analysis result of the mixture;
   a process of selecting microbe-related features to be used in the machine learning model from the microbial data based on a feature selection algorithm;
   a process of training the machine learning model with the microbe-related features; and
   a process of inputting, to the trained machine learning model, the microbial data collected from the subject to be tested and determining whether the constipation is present,
   wherein the microbe-related features include an amount of one or more microbes selected from genera included in families of Lachnospiraceae, Erysipelatoclostridiaceae, Pseudomondaeae, Prevotellaceae, Desulfovibrionaceae, Clostridiaceae, Gemellaceae, Bacteroidaceae, Streptococcaceae, Anaerofustaceae, Monoglobaceae, and RF39, and
   wherein the gut environment-like composition includes one or more of sodium chloride (NaCl), sodium carbonate ($NaHCO_3$), potassium chloride (KCl) and hemin.

2. The method of claim 1,
   wherein the number of the microbe-related features to be used in the machine learning model is 12 to 20.

3. The method of claim 1,
   wherein the process of analyzing the mixture includes:
   a process of culturing the mixture for 18 to 24 hours under anaerobic conditions; and
   a process of analyzing a culture in which the mixture has been cultured.

4. The method of claim 3,
   wherein the process of analyzing the culture includes:
   a process of centrifuging the culture to separate a supernatant and a precipitate and analyzing the supernatant and the precipitate.

5. The method of claim 3,
   wherein the microbial data include at least one of an amount, a concentration and a kind of a substance contained in the culture, and changes in a kind, a concentration, an amount and a diversity of bacteria included in microbiota, and the substance contained in the culture includes at least one of endotoxins, hydrogen sulfides, short-chain fatty acids (SCFAs) and microbiota-derived metabolites.

6. The method of claim 1,
wherein the feature selection algorithm includes at least one of a Boruta algorithm and a recursive feature elimination (RFE) algorithm.

7. The method of claim 1,
wherein the machine learning model includes at least one of a linear regression analysis (LRA) model, a random forest model, a generalized linear (GLM) model, a gradient boosting model, and an extreme gradient boosting (XGB) model.

8. The method of claim 1,
wherein the microbe-related features include an amount of one or more microbes selected from species included in genera of *Eubacterium, Ruminococcus, Pseudomonas, Prevotella, Bilophila, Clostridium, Gemella, Bacteroides, Streptococcus*, Anaerofustis, Monoglobus, and RF39.

9. An apparatus of diagnosing the presence or absence of constipation by using a machine learning model, comprising:
at least one processor; and
at least one memory for storing a computer program code,
wherein the at least one processor, when the computer program code is executed, is configured to:
extract microbial data based on an analysis result of a mixture of a gut-derived substance collected from a subject and a gut environment-like composition;
select microbe-related features to be used in the machine learning model from the microbial data based on a feature selection algorithm;
train the machine learning model with the microbe-related features; and
input, to the trained machine learning model, the microbial data collected from the subject to be tested and diagnose the constipation,
wherein the microbe-related features include an amount of one or more microbes selected from genera included in families of Lachnospiraceae, Erysipelatoclostridiaceae, Pseudomondaeae, Prevotellaceae, Desulfovibrionaceae, Clostridiaceae, Gemellaceae, Bacteroidaceae, Streptococcaceae, Anaerofustaceae, Monoglobaceae, and RF39, and wherein the gut environment-like composition includes one or more of sodium chloride (NaCl), sodium carbonate (NaHCO$_3$), potassium chloride (KCl) and hemin.

10. The apparatus of claim 9,
wherein the number of the microbe-related features to be used in the machine learning model is 12 to 20.

11. The apparatus of claim 9,
wherein the microbial data include at least one of an amount, a concentration and a kind of a substance contained in a culture in which the mixture has been cultured for 18 to 24 hours under anaerobic conditions, and changes in a kind, a concentration, an amount and a diversity of bacteria included in microbiota, and
the substance contained in the culture includes at least one of endotoxins, hydrogen sulfides, short-chain fatty acids (SCFAs) and microbiota-derived metabolites.

12. The apparatus of diagnosing the presence of absence of claim 9,
wherein the feature selection algorithm includes at least one of a Boruta algorithm and a recursive feature elimination (RFE) algorithm.

13. The apparatus of claim 9,
wherein the machine learning model includes at least one of a linear regression analysis (LRA) model, a random forest model, a generalized linear (GLM) model, a gradient boosting model, and an extreme gradient boosting (XGB) model.

14. The apparatus of claim 9,
wherein the microbe-related features include an amount of one or more microbes selected from species included in genera of *Eubacterium, Ruminococcus, Pseudomonas, Prevotella, Bilophila, Clostridium, Gemella, Bacteroides, Streptococcus*, Anaerofustis, Monoglobus, and RF39.

15. The method of claim 1,
wherein the gut environment-like composition further includes L-cysteine hydrochloride and mucin,
wherein the L-cysteine hydrochloride is at a concentration of 0.001% w/v to 5% w/v, and the mucin is at a concentration of 0.01% w/v to 5% w/v.

16. The apparatus of claim 9,
wherein the gut environment-like composition further includes L-cysteine hydrochloride and mucin,
wherein the L-cysteine hydrochloride is at a concentration of 0.001% w/v to 5% w/v, the mucin is at a concentration of 0.01% w/v to 5% w/v.

* * * * *